US010075996B2

(12) United States Patent
Cho et al.

(10) Patent No.: US 10,075,996 B2
(45) Date of Patent: *Sep. 11, 2018

(54) APPARATUS AND METHOD FOR PERFORMING RADIO NETWORK DEPLOYMENT STATE TEST PROCESS IN MOBILE COMMUNICATION SYSTEM

(71) Applicant: Samsung Electronics Co., Ltd, Suwon-si, Gyeonggi-do (KR)

(72) Inventors: Song-Yean Cho, Seoul (KR); Han-Na Lim, Seoul (KR); Sang-Soo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

This patent is subject to a terminal disclaimer.

(21) Appl. No.: 15/608,730

(22) Filed: May 30, 2017

(65) Prior Publication Data

US 2017/0311376 A1    Oct. 26, 2017

Related U.S. Application Data

(63) Continuation of application No. 13/631,400, filed on Sep. 28, 2012, now Pat. No. 9,667,523.

(30) Foreign Application Priority Data

Sep. 28, 2011   (KR) .................. 10-2011-0098606
May 2, 2012    (KR) .................. 10-2012-0046225

(51) Int. Cl.
*H04W 36/00*   (2009.01)
*H04W 76/27*   (2018.01)
(Continued)

(52) U.S. Cl.
CPC .......... *H04W 76/27* (2018.02); *H04W 4/021* (2013.01); *H04W 36/18* (2013.01);
(Continued)

(58) Field of Classification Search
CPC . H04W 76/027; H04W 84/042; H04W 12/06; H04W 28/0289; H04W 40/20; H04M 15/66
(Continued)

(56) References Cited

U.S. PATENT DOCUMENTS

2010/0167729 A1   7/2010   Kim et al.
2011/0195668 A1   8/2011   Lee et al.
(Continued)

FOREIGN PATENT DOCUMENTS

KR    20100078236 A    7/2010
KR    20110045764 A    5/2011

OTHER PUBLICATIONS

Extended European Search Report dated Jul. 9, 2015 in connection with European Application No. 12835089.9, 9 pages.
(Continued)

*Primary Examiner* — Joseph Arevalo

(57) ABSTRACT

An apparatus and method for performing a radio network deployment state test process in a mobile communication system are provided. In the method, a User Equipment (UE) receives an equivalent Minimization of Drive Test (MDT)_Public Land Mobile Network (PLMN) list from a Mobility Management Entity (MME) or an enhanced Node B (eNB), wherein a PLMN of the MME is an MDT_PLMN of the UE, the MDT_PLMN is a PLMN in which the UE performs an MDT process as a radio network deployment state test process using an MDT scheme, the equivalent MDT_PLMNs are equivalent PLMNs of the MDT_PLMN, and
(Continued)

the equivalent MDT_PLMN Identifiers (IDs) represent PLMN IDs of equivalent PLMNs of the PLMN of the MME.

20 Claims, 17 Drawing Sheets

(51) Int. Cl.
*H04W 76/04* (2009.01)
*H04W 92/10* (2009.01)
*H04W 88/12* (2009.01)
*H04W 4/021* (2018.01)
*H04W 36/18* (2009.01)
*H04W 92/12* (2009.01)
*H04W 76/02* (2009.01)
*H04W 76/15* (2018.01)

(52) U.S. Cl.
CPC ....... *H04W 76/025* (2013.01); *H04W 76/046* (2013.01); *H04W 76/15* (2018.02); *H04W 88/12* (2013.01); *H04W 92/10* (2013.01); *H04W 92/12* (2013.01)

(58) Field of Classification Search
USPC ........ 455/436, 67.11, 423, 422.1, 418, 435.1
See application file for complete search history.

(56) References Cited

U.S. PATENT DOCUMENTS

| | | | |
|---|---|---|---|
| 2012/0108199 | A1 | 5/2012 | Wang et al. |
| 2012/0214493 | A1 | 8/2012 | Suh et al. |
| 2012/0252471 | A1 | 10/2012 | Futaki |
| 2013/0196604 | A1 | 8/2013 | Jung et al. |

OTHER PUBLICATIONS

3GPP TSG RAN WG2 Meeing #75; "MDT Continuity between Different PLMNs" R2-113938; Athens, Greece; Aug. 22-26, 2011; 3 pages.
3GPP TSG RAN WG2 Meeing #73; "MDT support across the PLMNs identified as equivalent" R3-112136; Athens, Greece; Aug. 22-26, 2011; 4 pages.
3GPP TSG RAN WG2 Meeing #75; "MDT operation in networks that use equivalent PLMNs and/or RAN sharing", R2-113775; Athens, Greece; Aug. 22-26, 2011; 7 pages.
3GPP TSG SA WG5 (Telecom Management) Meeting #78; "Inter-PLMN MDT for operator that uses more than one PLMN—with ASN impact"; Istanbul, Turkey; Aug. 22-26, 2011; 16 pages.
International Search Report dated Feb. 27, 2013 in connection with International Application No. PCT/KR2012/007969, 3 pages.
Written Opinion of International Searching Authority dated Feb. 27, 2013 in connection with International Application No. PCT/KR2012/007969, 4 pages.
3GPP TS 32.422 V11.1.0 (Sep. 2011), 3rd Generation Partnership Project; Technical Specification Group Services and System Aspects; Telecommunication management; Subscriber and equipment trace; Trace control and configuration management (Release 11), 117 pages.
3GPP TS 37.320 V10.2.0 (Jun. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10), 17 pages.
Communication from a foreign patent office in a counterpart foreign application, European Patent Office, "Communication pursuant to Article 94(3) EPC," Application No. Ep 12 835 089.9, dated Jul. 11, 2017, 8 pages.
Communication from a foreign patent office in a counterpart foreign application, European Patent Office, "Communication pursuant to Article 94(3) EPC," European Application No. EP 12 835 089.9, May 3, 2018, 6 pages.
Huawei, "Draft Baseline Introduction of MDT PLMN List," xR3-121590, 3GPP TSG-RAN WG3 Meeting #77, Qingdao, P.R. China, Aug. 13-17, 2012, 16 pages.
3GPP TS 37.320 V11.1.0 (Sep. 2012), Technical Specification, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11), 21 pages.

APPARATUS AND METHOD FOR PERFORMING RADIO NETWORK DEPLOYMENT STATE TEST PROCESS IN MOBILE COMMUNICATION SYSTEM

CROSS-REFERENCE TO RELATED APPLICATION(S) AND CLAIM OF PRIORITY

The present application is continuation under 35 U.S.C. § 120 of U.S. patent application Ser. No. 13/631,400 filed on Sep. 28, 2012 and under 35 U.S.C. § 119(a) of a Korean Patent Application No. 10-2011-0098606 filed on Sep. 28, 2011, and a Korean Patent Application No. 10-2012-0046225 filed on May 2, 2012, both in the Korean Intellectual Property Office, the entire disclosures of which are hereby incorporated by reference.

TECHNICAL FIELD

The present disclosure relates to an apparatus and method for performing a radio network deployment state test process for testing radio network deployment state in a mobile communication system.

BACKGROUND

In a mobile communication system, a User Equipment (UE) performs a radio network deployment state test process for collecting logs for radio network deployment state information such as radio link failure occurrence, signal strength of a signal which is transmitted to/received from a radio communication network, and the like during a predetermined period in order to test radio network deployment state.

The description of the radio network deployment state test process will be described with reference to an Evolved Packet System (EPS) as a typical example of a mobile communication system that has been proposed up to now.

In the EPS, a radio network deployment state test process for testing radio network deployment state such as coverage of a radio link and radio link failure occurrence uses a Minimization of Drive Test (MDT) scheme, and the description of the MDT scheme will be followed.

The MDT scheme represents a radio network deployment state test scheme which uses User Equipments (UEs) receiving a communication service in a field in order to prevent occurrence of shadow areas and optimize establishment location of enhanced Node Bs (eNBs) on a radio network deployment.

The MDT scheme includes two schemes, i.e., an immediate MDT scheme and a logged MDT scheme according to operation modes of a UE. The immediate MDT scheme is an MDT scheme which is performed if an operation mode of the UE is a connected mode, and the logged MDT scheme is an MDT scheme which is performed if an operation mode of the UE is an idle mode.

The mobile communication system should transmit MDT configuration information indicating a period (or duration), an interval, and a region where the eNB should collect radio network deployment state information to the UE. If the immediate MDT scheme is used as the radio network deployment state test scheme, for example, the MDT configuration information is transmitted to the UE operating in the connected mode using a Radio Resource Control (RRC) Reconfiguration message. If the logged MDT scheme is used as the radio network deployment state test scheme, for example, the MDT configuration information is transmitted to the UE operating in the idle mode using a Logged Measurement Configuration message.

Upon operating in the connected mode, the UE receives the MDT configuration information through the RRC Reconfiguration message. Alternatively, the UE receives the MDT configuration information through the Logged Measurement Configuration message upon operating in the idle mode. After receiving the MDT configuration information, the UE sets a registered Public Land Mobile Network (PLMN) in which the UE is registered as an MDT_PLMN. The MDT_PLMN represents a PLMN in which the UE performs an MDT process, i.e., a PLMN which commands the UE to perform the MDT process, and the MDT process represents a radio network deployment state test process using the MDT scheme.

In the current EPS, the UE does not perform the MDT process if the UE moves to another area not the MDT_PLMN which commands the UE to perform the MDT process. The UE cancels the MDT process result collected through the performance of the MDT process not reporting the MDT process result even if a new PLMN, not the MDT_PLMN commands the UE to perform the MDT process. If one mobile communication service operator uses a plurality of PLMN Identifiers (IDs) for one PLMN, or a plurality of mobile communication service operators inter-work and provide a mobile communication service, it is difficult to use an MDT scheme used in the current EPS, and the reason is described follow.

A mobile communication service operator sets a PLMN ID of a PLMN as "A" if the PLMN is used in the $3^{rd}$ Generation (3G) mobile communication system, sets the PLMN ID of the PLMN as "B" if the PLMN is used in the $4^{th}$ Generation (4G) mobile communication system, so the PLMN can have a plurality of PLMN IDs.

A local mobile communication service operator M which provides a mobile communication service in an area "M" and a local mobile communication service operator N which provides a mobile communication service in an area "N" use different PLMN IDs. If the local mobile communication service operators M and N provide a mobile communication service operator united_mobile communication service, the local mobile communication service operators M and N are united mobile communication service operators, and the united mobile communication service operators provide a mobile communication service using a plurality of PLMN IDs.

As described above, in the current EPS, a UE does not perform an MDT process if the UE moves to another area not an MDT_PLMN which commands the UE to perform the MDT process. The UE cancels an MDT process result collected through the performance of the MDT process not reporting the MDT process result even if a new PLMN, not the MDT_PLMN commands the UE to perform the MDT process. So, there is a need for a method in which a UE performs an MDT process for a PLMN having a plurality of PLMN IDs, and reports an MDT process result to the PLMN.

SUMMARY

To address the above-discussed deficiencies of the prior art, it is a primary object to provide an apparatus and method for performing a radio network deployment state test process in a mobile communication system.

Another aspect of an embodiment of the present disclosure is to provide an apparatus and method for performing a radio network deployment state test process in a mobile communication system using a PLMN having a plurality of PLMN IDs.

In accordance with one aspect of the present disclosure, there is provided a User Equipment (UE) in a mobile communication system. The UE comprises a receiver for receiving an equivalent Minimization of Drive Test (MDT)_Public Land Mobile Network (PLMN) list from a Mobility Management Entity (MME) or an enhanced Node B (eNB), and a controller for continuously performing an MDT process as a radio network deployment state test process using an MDT scheme upon moving between equivalent MDT_PLMNs corresponding to equivalent MDT_PLMN Identifiers (IDs) included in the equivalent MDT_PLMN list, wherein a PLMN of the MME is an MDT_PLMN of the UE, the MDT_PLMN is a PLMN in which the UE performs the MDT process, the equivalent MDT_PLMNs are equivalent PLMNs of the MDT_PLMN, and the equivalent MDT_PLMN IDs represent PLMN IDs of equivalent PLMNs of the PLMN of the MME.

In accordance with another aspect of the present disclosure, there is provided an enhanced Node B (eNB) in a mobile communication system. The eNB comprises a receiver for receiving an equivalent Minimization of Drive Test (MDT)_Public Land Mobile Network (PLMN) list from a Mobility Management Entity (MME), and a transmitter for transmitting the equivalent MDT_PLMN list to the UE, wherein the equivalent MDT_PLMN list includes equivalent MDT_PLMN Identifiers (IDs), and wherein a PLMN of the MME is an MDT_PLMN of the UE, the MDT_PLMN is a PLMN in which the UE performs an MDT process, the equivalent MDT_PLMN are equivalent PLMNs of the MDT_PLMN, and the equivalent MDT_PLMN IDs represent PLMN IDs of equivalent PLMNs of the PLMN of the MME.

In accordance with further another aspect of the present disclosure, there is provided a Mobility Management Entity (MME) in a mobile communication system. The MME comprises a transmitter for transmitting an equivalent Minimization of Drive Test (MDT)_Public Land Mobile Network (PLMN) list to a UE, and transmitting the equivalent MDT_PLMN list to an enhanced Node B (eNB), wherein the equivalent MDT_PLMN list includes equivalent MDT_PLMN Identifiers (IDs), and wherein a PLMN of the MME is an MDT_PLMN of the UE, the MDT_PLMN is a PLMN in which the UE performs an MDT process, the equivalent MDT_PLMN are equivalent PLMNs of the MDT_PLMN, and the equivalent MDT_PLMN IDs represent PLMN IDs of equivalent PLMNs of the PLMN of the MME.

In accordance with still another aspect of the present disclosure, there is provided a method for performing a radio network deployment state test process by a User Equipment (UE) in a mobile communication system. The method includes receiving an equivalent Minimization of Drive Test (MDT)_Public Land Mobile Network (PLMN) list from a Mobility Management Entity (MME) or an enhanced Node B (eNB), and continuously performing an MDT process as a radio network deployment state test process using an MDT scheme upon moving between equivalent MDT_PLMNs corresponding to equivalent MDT_PLMN Identifiers (IDs) included in the equivalent MDT_PLMN list, wherein a PLMN of the MME is an MDT_PLMN of the UE, the MDT_PLMN is a PLMN in which the UE performs the MDT process, the equivalent MDT_PLMNs are equivalent PLMNs of the MDT_PLMN, and the equivalent MDT_PLMN IDs represent PLMN IDs of equivalent PLMNs of the PLMN of the MME.

In accordance with still another aspect of the present disclosure, there is provided a method for supporting a User Equipment (UE) to perform a radio network deployment state test process by an enhanced Node B (eNB) in a mobile communication system. The method includes receiving an equivalent Minimization of Drive Test (MDT)_Public Land Mobile Network (PLMN) list from a Mobility Management Entity (MME); and transmitting the equivalent MDT_PLMN list to the UE, wherein the equivalent MDT_PLMN list includes equivalent MDT_PLMN Identifiers (IDs), and wherein a PLMN of the MME is an MDT_PLMN of the UE, the MDT_PLMN is a PLMN in which the UE performs an MDT process, the equivalent MDT_PLMN are equivalent PLMNs of the MDT_PLMN, and the equivalent MDT_PLMN IDs represent PLMN IDs of equivalent PLMNs of the PLMN of the MME.

In accordance with still another aspect of the present disclosure, there is provided method for supporting a User Equipment (UE) to perform a radio network deployment state test process by a Mobility Management Entity (MME) in a mobile communication system. The method includes transmitting an equivalent Minimization of Drive Test (MDT)_Public Land Mobile Network (PLMN) list to a UE, and transmitting the equivalent MDT_PLMN list to an enhanced Node B (eNB), wherein the equivalent MDT_PLMN list includes equivalent MDT_PLMN Identifiers (IDs), and wherein a PLMN of the MME is an MDT_PLMN of the UE, the MDT_PLMN is a PLMN in which the UE performs an MDT process, the equivalent MDT_PLMN are equivalent PLMNs of the MDT_PLMN, and the equivalent MDT_PLMN IDs represent PLMN IDs of equivalent PLMNs of the PLMN of the MME.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
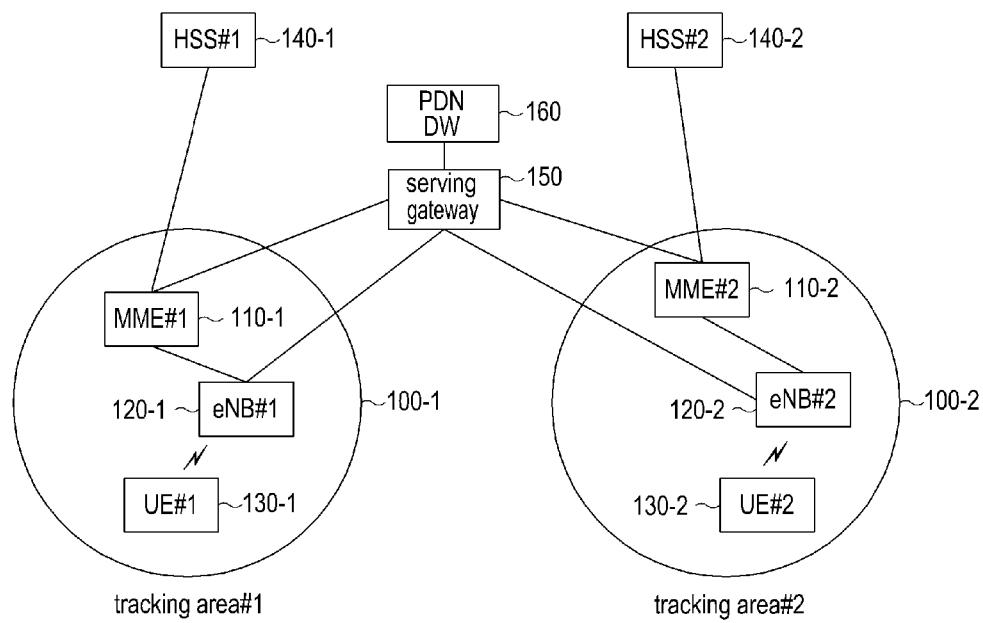
FIG. 1 schematically illustrates an EPS in accordance with an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication devices.

Preferred embodiments of the present disclosure will now be described in detail with reference to the accompanying drawings. In the following description, specific details such as detailed configuration and components are merely provided to assist the overall understanding of exemplary embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

An embodiment of the present disclosure proposes an apparatus and method for performing a radio network deployment state test process for testing radio network deployment state test in a mobile communication system.

Another embodiment of the present disclosure proposes an apparatus and method for performing a radio network deployment state test process in a mobile communication system using a Public Land Mobile Network (PLMN) having a plurality of PLMN Identifiers (IDs).

Further another embodiment of the present disclosure proposes an apparatus and method for performing a radio network deployment state test process in a mobile communication system in which mobile communication service operators using different PLMN IDs respectively interwork and provide a mobile communication service.

Embodiments of the present disclosure will be described below with reference to a mobile communication system, for example, an Evolved Packet System (EPS). However, it will be understood by those of ordinary skill in the art that the mobile communication system can be any one of a Long-Term Evolution (LTE) mobile communication system, a Long-Term Evolution Advanced (LTE-A) mobile communication system and an Institute of Electrical and Electronics Engineers (IEEE) 802.16m mobile communication system as well as the EPS.

For convenience, the followed situations are assumed.

(1) A PLMN of a Mobility Management Entity (MME) performing a Minimization of Drive Test (MDT) user consent information acquisition process with a User Equipment (UE), i.e., an MME to which the UE transmits an Attach Request message is set as an MDT_PLMN of the UE. The MDT_PLMN represents a PLMN in which the UE performs an MDT process, i.e., a PLMN which commands the UE to perform the MDT process, and the MDT process represents a radio network deployment state test process using an MDT scheme.

(2) A PLMN of an MME has at least one equivalent PLMN, PLMN IDs of equivalent PLMNs are equivalent PLMN IDs, and the equivalent PLMN IDs are included in an equivalent PLMN list.

(3) An equivalent MDT_PLMN list can be generated by setting an equivalent PLMN list as the equivalent MDT_PLMN list or setting a part of equivalent PLMN IDs included in the equivalent PLMN list as the equivalent MDT_PLMN list. The description of selecting the part of the equivalent PLMN IDs included in the equivalent PLMN list will be omitted. Equivalent PLMN IDs included in the equivalent MDT_PLMN are equivalent MDT_PLMN IDs.

FIG. 1 schematically illustrates an EPS in accordance with an embodiment of the present disclosure. An EPS includes a plurality of tracking areas, for example, two tracking areas, i.e., a tracking area #1 100-1 and a tracking area #2 100-2, and the description of each of the tracking area #1 100-1 and the tracking area #2 100-2 will be followed.

The tracking area #1 100-1 is an area in which mobility of User Equipments (UEs) is managed by a Mobility Management Entity (MME) #1 110-1. The tracking area #1 100-1 includes an enhanced Node B (eNB) #1 120-1 connected to the MME #1 110-1 and a UE #1 130-1 located in a cell of the eNB #1 120-1. The MME #1 110-1 is connected to a Home Subscriber Server (HSS) #1 140-1 and a serving gateway 150, and performs a management operation related with mobility, location, and registration of the UE #1 130-1. The HSS #1 140-1 manages authentication information and service information for the UE #1 130-1. The serving gateway 150 is connected to a packet data network gateway 160.

The tracking area #2 100-2 is an area in which mobility of UEs is managed by a MME #2 110-2. The tracking area #2 100-2 includes an eNB #2 120-2 connected to the MME #2 110-2 and a UE #2 130-2 located in a cell of the eNB #2 120-2. The MME #2 110-2 is connected to an HSS #2 140-2 and the serving gateway 150, and performs a management operation related with mobility, location, and registration of the UE #2 130-2. The HSS #2 140-2 manages authentication information and service information for the UE #2 130-2.

In the current EPS, it is difficult to use MDT schemes, i.e., an immediate MDT scheme and a logged MDT scheme if one mobile communication service operator uses a plurality of PLMN IDs. The immediate MDT scheme is an MDT scheme which is performed if an operation mode of a UE is a connected mode, and the logged MDT scheme is an MDT scheme which is performed if an operation mode of the UE is an idle mode.

The present disclosure proposes various embodiments, i.e., the first to the twelfth embodiments in which a UE can continuously perform an MDT process even if mobile communication service operators using different PLMN IDs respectively interwork and provide a mobile communication service operator united-mobile communication service. Here, it will be assumed that one mobile communication service operator uses a plurality of PLMN IDs. The first to the twelfth embodiments will be described.

First, the first to the second embodiments will be described as follows.

In the first to the second embodiments, a mobile communication service operator sets a plurality of PLMN IDs for a PLMN as equivalent PLMN IDs, sets equivalent PLMNs using the equivalent PLMN IDs as equivalent MDT_PLMNs of an MDT_PLMN, stores the equivalent MDT_PLMNs of the MDT_PLMN upon using the plurality of PLMN IDs for the PLMN. Afterwards a UE performs an MDT process.

In the immediate MDT process, if a PLMN ID of a target PLMN is included in an equivalent MDT_PLMN list even though a PLMN ID is changed, the UE notifies a target eNB that the UE can use MDT logs, and provides a collected MDT process result with the target eNB if an eNB included in a target PLMN, i.e., the target eNB requests the UE to report the collected MDT process result. The target eNB transmits the collected MDT process result, i.e., the MDT logs reported by the UE to a Trace Collection Entity (TCE). A serving eNB transmits MDT logs which are not reported to a TCE and MDT configuration information of the UE using a Handover Required message (in an S1 handover case) or a Handover Request message to the target eNB.

If the handover process performed by the UE is an S1 handover process, MDT logs which are not reported to the TCE and the MDT configuration information of the UE are transmitted to the target eNB through the Handover Required message. If the handover process performed by the UE is an X2 handover process, MDT logs which are not reported to the TCE and the MDT configuration information of the UE are transmitted to the target eNB through the Handover Request message. The MDT configuration information includes a period (or duration), an interval, and a region where the eNB should collect radio network deployment state information. Establishment location of the TCE is not limited hereto, and the TCE is connected to the serving eNB and the MME.

Figure 2:
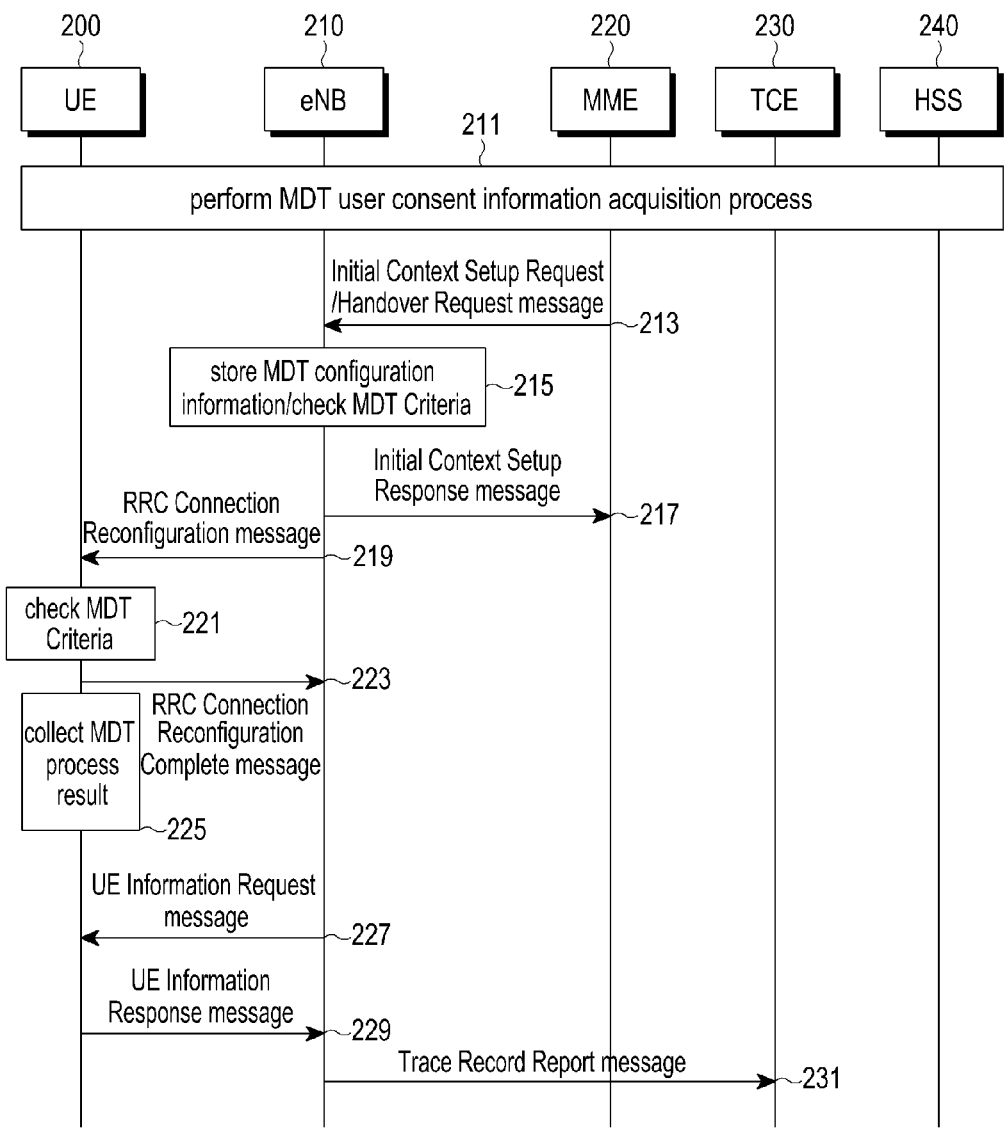
FIG. 2 is a signal flow diagram schematically illustrating performing an immediate MDT process in an EPS in accordance with the first embodiment of the present disclosure.

FIG. 2 is a signal flow diagram schematically illustrating performing an immediate MDT process in an EPS in accordance with the first embodiment of the present disclosure. The EPS includes a UE 200, an eNB 210, a MME 220, a TCE 230 and an HSS 240. The UE 200, the MME 220 and the HSS 240 perform an MDT user consent information acquisition process (step 211). The MDT user consent information acquisition process will be described as follows.

The UE 200 transmits an Attach Request message to the MME 220. After receiving the Attach Request message from the UE 200, the MME 220 transmits a Location Update Request message to the HSS 240 in order to acquire subscriber information for the UE 200. After receiving the Location Update Request message from the MME 220, the HSS 240 detects whether the UE 200 consents to perform the MDT process, and transmits a Location Update ACK message, as a response message to the Location Update Request message, with the subscriber information of the UE 200 including whether the UE 200 consents to perform an MDT process according to the detection result.

After receiving the Location Update ACK message from the HSS 240, the MME 220 detects whether the UE 200 consents to perform the MDT process by detecting information included in the Location Update ACK message, and generates MDT user consent information according to the detection result. In FIG. 2, it will be assumed that the UE 200 has consented to perform the MDT process, and the MDT user consent information indicates that the UE 200 has consented to perform the MDT process.

After receiving the Location Update ACK message including the subscriber information indicating that the UE 200 consents to perform the MDT process from the HSS 240, the MME 220 stores the MDT user consent information generated according to the subscriber information as context information for the UE 200, and transmits the initial context setup request message including the MDT user consent information to eNB 210 while transferring an Attach Accept message to the UE 200 via the eNB 210. Afterwards the eNB 210 can command the UE 200 to perform an MDT process after receiving the initial UE context setup request message including the MDT user consent information from the MME 220.

The MME 220 generates an equivalent PLMN list including PLMN IDs of PLMNs set as equivalent PLMNs, and transmits the equivalent PLMN list to the UE 200. The equivalent PLMN list is transmitted to the UE 200 through an Attach Accept message. After receiving the Attach Accept message from the MME 220, the UE 200 detects equivalent PLMNs using the equivalent PLMN list included in the Attach Accept message. The UE 200 sets a registered PLMN as an MDT_PLMN and sets PLMNs corresponding to the PLMN IDs included in the equivalent PLMN list as equivalent MDT_PLMNs if the eNB 210 commands the UE 200 to perform a radio network deployment state test process at step 219. Step 219 will be described as follow. The registered PLMN of the UE 200 is set as the MDT_PLMN. However, it will be understood by those of ordinary skill in the art that a PLMN which the UE 200 has selected can be set as the MDT_PLMN, not the registered PLMN of the UE 200. There can be various schemes for selecting a PLMN set as the MDT_PLMN, and the description of the various schemes for selecting the PLMN set as the MDT_PLMN will be omitted.

Otherwise, if an MME of the UE 200 as a prior MME is changed to a new MME while the UE 200 performs a handover process, the new MME receives the MDT user consent information from the prior MME using a UE context.

After the MDT user consent information acquisition process between the UE 200, the MME 220 and the HSS 240 has been performed, if the MME 220 is the prior MME, the MME 220 transmits an Initial Context Setup Request message to the eNB 210 (step 213). The Initial Context Setup Request message includes Trace Activation information, and the Trace Activation information includes Logged Measurement Configuration information.

The Logged Measurement Configuration information includes a cell list, a Trace Area (TA) list, or a total PLMN list, and logged MDT process information which the UE 200 should report upon performing a logged MDT process, or immediate MDT process information which the UE 200 should report upon performing an immediate MDT process.

TABLE 1

| Information | Desription |
|---|---|
| MDT Activation | Information to activate MDT |
| Area Scope of MDT | The area info to activate MDT It could be cell based or TA list or PLMN Wide. In case of Cell based, Cell id list is included. In case of TA based, TA list is included. In case of PLMN wide, it is marked as PLMN wide. |
| MDT Mode | MDT mode to perform (immediate or logged) For each mode (immediate or logged), it is configured what the UE reports. The reporting interval or duration can also be configured. RSRP and RSRQ is an example of what the UE reports as MDT process result. |

In the exemplary Table 1, Logged Measurement Configuration information represents Logged Measurement Configuration information which is transmitted from the MME 220 to the eNB 210 in a current EPS. In the present disclosure, an equivalent MDT_PLMN list as well as information expressed in Table 1 is included in the Logged Measurement Configuration information. In the present disclosure, the equivalent MDT_PLMN list can be included in the MDT configuration information or the logged_MDT configuration information included in the MDT configuration information in order to apply all of a logged_MDT scheme and an immediate MDT scheme.

Otherwise, if the MME 220 is the new MME, the MME 220 transmits a Handover Request message to the eNB 210 (step 213). The Handover Request message includes Logged Measurement Configuration information.

After receiving the Initial Context Setup Request message or the Handover Request message from the MME 220, the eNB 210 stores the MDT Configuration information, Logged Measurement Configuration information included in the Initial Context Setup Request message, or the Handover Request message, and checks a MDT Criteria using the Logged Measurement Configuration information (step 215). The checking of the MDT Criteria using the Logged Measurement Configuration information represents checking a region where the UE 200 should perform an immediate MDT process, i.e., a region where the UE 200 should perform the immediate MDT process using the cell list, the TA list, or the total PLMN list.

Afterwards the eNB 210 transmits an Initial Context Setup Response message as a response message to the Initial Context Setup Request message to the MME 220 (step 217).

The eNB 210 transmits a Radio Resource Control (RRC) Connection Reconfiguration message to the UE 200 (step 219). The RRC Connection Reconfiguration message includes immediate MDT process information. The immediate MDT process information includes signal strength information such as Reference Signal Received Power (RSRP) information, Reference Signal Received Quality (RSRQ) information, and the like as expressed in Table 1. For example, the reference signal can be a pilot signal. The RRC Connection Reconfiguration message includes the equivalent MDT_PLMN list.

After receiving the RRC Connection Reconfiguration message from the eNB 210, the UE 200 determines whether an MDT_PLMN is a registered PLMN of the UE 200, or one of equivalent MDT_PLMNs corresponding to equivalent MDT_PLMN IDs included in the equivalent MDT_PLMN list which the UE 200 sets and stores by checking the MDT Criteria (step 221). If the MME 220 is the prior MME, the UE 200 determines whether the MDT_PLMN is the registered PLMN, and if the MME 220 is the new MME, the UE 200 determines whether the MDT_PLMN is one of equivalent MDT_PLMNs corresponding to equivalent MDT_PLMN IDs included in the equivalent MDT_PLMN list.

The UE 200 transmits a RRC Connection Reconfiguration Complete message as a response message to the RRC Connection Reconfiguration message to the eNB 210 (step 223). The UE 200 performs an MDT process using an immediate MDT scheme, and collects a MDT process result according to the MDT process performance (step 225).

After receiving the RRC Connection Reconfiguration Complete message from the UE 200, the eNB 210 transmits a UE Information Request message to the UE 200 (step 227). The UE Information Request message includes a logMeasReportReq parameter indicating that the eNB 210 requests the UE 200 to report the collected MDT process result.

After receiving the UE Information Request message from the eNB 210, the UE 200 transmits a UE Information Response message including a logMeasReport parameter indicating that the UE 200 transmits the collected MDT process result to the eNB 210 (step 229). After receiving the UE Information Response message from the UE 200, the eNB 210 transmits a Trace Record Report message to the TCE 230 (step 231). The Trace Record Report message includes the logMeasReport parameter.

Figure 3:
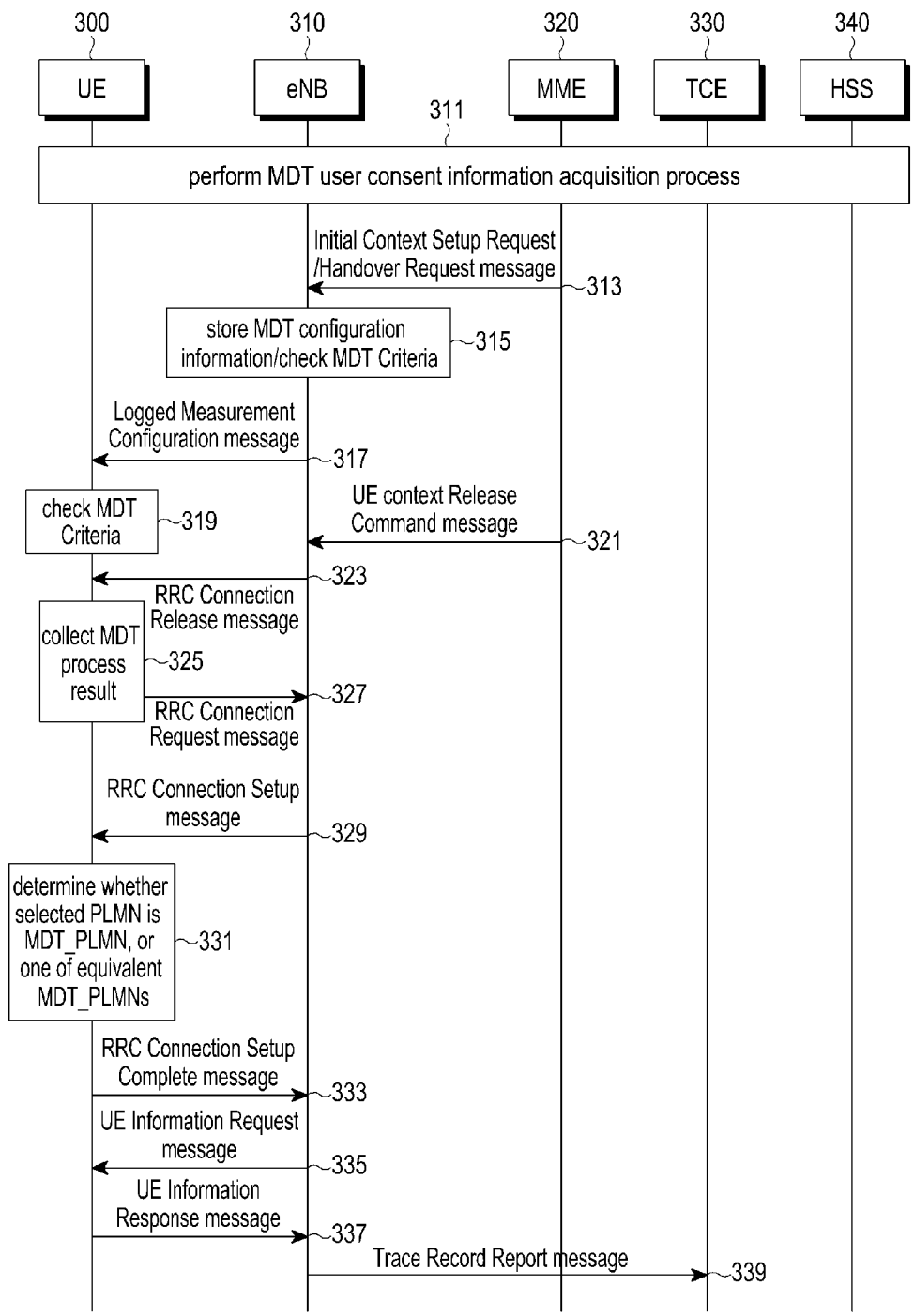
FIG. 3 is a signal flow diagram schematically illustrating performing a logged MDT process in an EPS in accordance with the second embodiment of the present disclosure.

FIG. 3 is a signal flow diagram schematically illustrating performing a logged MDT process in an EPS in accordance with the second embodiment of the present disclosure.

Referring to FIG. 3, the EPS includes a UE 300, an eNB 310, a MME 320, a TCE 330 and an HSS 340.

The operations of steps 311 to 315 in FIG. 3 are identical to the operations of steps 211 to 215 in FIG. 2, and the operations of steps 335 to 339 are identical to the operations of steps 227 to 231 in FIG. 2, so the detailed description of the operations of the steps 311 to 315 and 335 to 339 will be omitted.

After performing an operation of step 315, the eNB 310 transmits a Logged Measurement Configuration message to the UE 300 (step 317). The Logged Measurement Configuration message includes a logged MDT process information. The logged MDT process information includes information need for performing a logged MDT process, i.e., information on a period (or duration) and a region where the UE 300 should perform the logged MDT process.

The logged MDT process information is expressed in the exemplary Table 2.

TABLE 2

```
LoggedMeasurementConfiguration-r10 ::= SEQUENCE {
criticalExtensions                      CHOICE {
c1                                      CHOICE{
  loggedMeasurementConfiguration-r10
LoggedMeasurementConfiguration-r10-IEs,
  spare3 NULL, spare2 NULL, spare1 NULL
},
  criticalExtensionsFuture              SEQUENCE { }
}
}
LoggedMeasurementConfiguration-r10-IEs ::= SEQUENCE {
traceReference-r10              TraceReference-r10,
traceRecordingSessionRef-r10    OCTET STRING (SIZE (2)),
tce-Id-r10                      OCTET STRING (SIZE (1)),
absoluteTimeInfo-r10            AbsoluteTimeInfo-r10,
areaConfiguration-r10           AreaConfiguration-r10
OPTIONAL,-- Need OR
loggingDuration-r10             LoggingDuration-r10,
loggingInterval -r10            LoggingInterval-r10,
nonCriticalExtension            SEQUENCE { }
OPTIONAL -- Need OP
}
```

In exemplary Table 2, logged MDT process information represents logged MDT process information which is transmitted from the eNB 310 to the UE 300 in a current EPS. In the present disclosure, an equivalent MDT_PLMN list as well as information expressed in Table 2 is included in the logged MDT process information.

After receiving the Logged Measurement Configuration message from the eNB 310, the UE 300 determines whether an MDT_PLMN is a registered PLMN of the UE 300, or one of equivalent MDT_PLMNs corresponding to equivalent MDT_PLMN IDs included in the equivalent MDT_PLMN list which the UE 300 sets and stores by checking the MDT Criteria. The UE 300 stores the MDT Criteria (step 319), and can later use the MDT Criteria upon performing an MDT process.

The MME 320 transmits a UE context Release Command message to the eNB 310 (step 321). After receiving the UE context Release Command message from the MME 320, the eNB 310 transmits a RRC Connection Release message to the UE 300 (step 323). After receiving the RRC Connection Release message, the UE 300 releases a RRC connection established between the UE 300 and the eNB 310, and operates in an idle mode according to the RRC connection release.

The UE 300 operating in the idle mode checks the stored MDT Criteria, and performs a logged MDT process (step 325). The process of checking the MDT Criteria is performed by determining whether a PLMN which the UE 300 currently camps is identical to the MDT_PLMN which the UE 300 stores, and checking a Criteria for information on a region and a period (or duration) where an MDT process is performed. The UE 300 can perform the logged MDT process if the PLMN which the UE 300 currently camps is one of equivalent MDT_PLMNs corresponding to equivalent MDT_PLMN IDs included in the equivalent MDT_PLMN list which the UE 300 stores (step 325).

In certain embodiments, if the UE 300 wants to reestablish a RRC connection with the eNB 310 on the state which a RRC connection between the UE 300 and the eNB 310 is released, the UE 300 transmits a RRC Connection Request message to the eNB 310 (step 327). It will be understood by those of ordinary skill in the art that a timing point at which the UE 300 reestablishes the RRC connection with the eNB 310 is not limited hereto. After receiving the RRC Connection Request message from the UE 300, the eNB 310 detects that the UE 300 requests a RRC connection, so transmits a RRC Connection Setup message indicating that the eNB 310 requests the UE 300 to set up the RRC connection to the UE 300 (step 329).

After receiving the RRC Connection Setup message from the eNB 310, the UE 300 determines whether a selected PLMN is an MDT_PLMN of the UE 300, or one of equivalent MDT_PLMNs corresponding to equivalent MDT_PLMN IDs included in the equivalent MDT_PLMN list (step 331). If the MME 320 is the prior MME, the UE 300 determines whether the selected PLMN is the MDT_PLMN, and if the MME 320 is the new MME, the UE 300 determines whether the selected PLMN is one of the equivalent MDT_PLMNs corresponding to the equivalent MDT_PLMN IDs included in the equivalent MDT_PLMN list.

The reason why the UE 300 compares the selected PLMN with the MDT_PLMN or one of the equivalent MDT_PLMNs is that the UE 300 can set the MDT_PLMN as the selected PLMN, not the registered PLMN. There can be various schemes for selecting a PLMN set as the MDT_PLMN, and the description of the various schemes for selecting the PLMN set as the MDT_PLMN will be omitted. In the flowchart of FIG. 3, the selected PLMN is the MDT_PLMN if the MME 320 is the prior MME, and the selected PLMN is one of the equivalent MDT_PLMNs if the MME 320 is the new MME.

The UE 300 transmits a RRC Connection Setup Complete message as a response message to the RRC Connection Setup message to the eNB 310 (step 333). The RRC Connection Setup Complete message includes a logMeasAvailable parameter indicating an available MDT process result. A value of the logMeasAvailable parameter is set as "true" if the selected PLMN is the MDT_PLMN when the MME 320 is the prior MME, and if the selected PLMN is one of the equivalent MDT_PLMNs when the MME 320 is the new MME.

In the first to the second embodiments, a UE performs an MDT process for a registered PLMN and equivalent MDT_PLMNs, so roaming UEs can perform an MDT process.

In the first to the second embodiments, it is necessary for determining whether a UE consents to perform an MDT process, and the UE can any time withdraw the MDT user consent information. And, regulations for setting the MDT user consent information are different in other countries, so it can be difficult to use the MDT user consent information set in the case if the UE performs a roaming operation.

This problem can be solved if an MDT user consent information for an MDT process is limited to a Home PLMN (HPLMN) and Home Equivalent PLMNs (HEPLMNs), so a method in which the UE performs an MDT process by limiting the MDT user consent information to the HPLMN and the HEPLMNs is proposed in the third to the sixth embodiments as described as follow.

Figure 4:
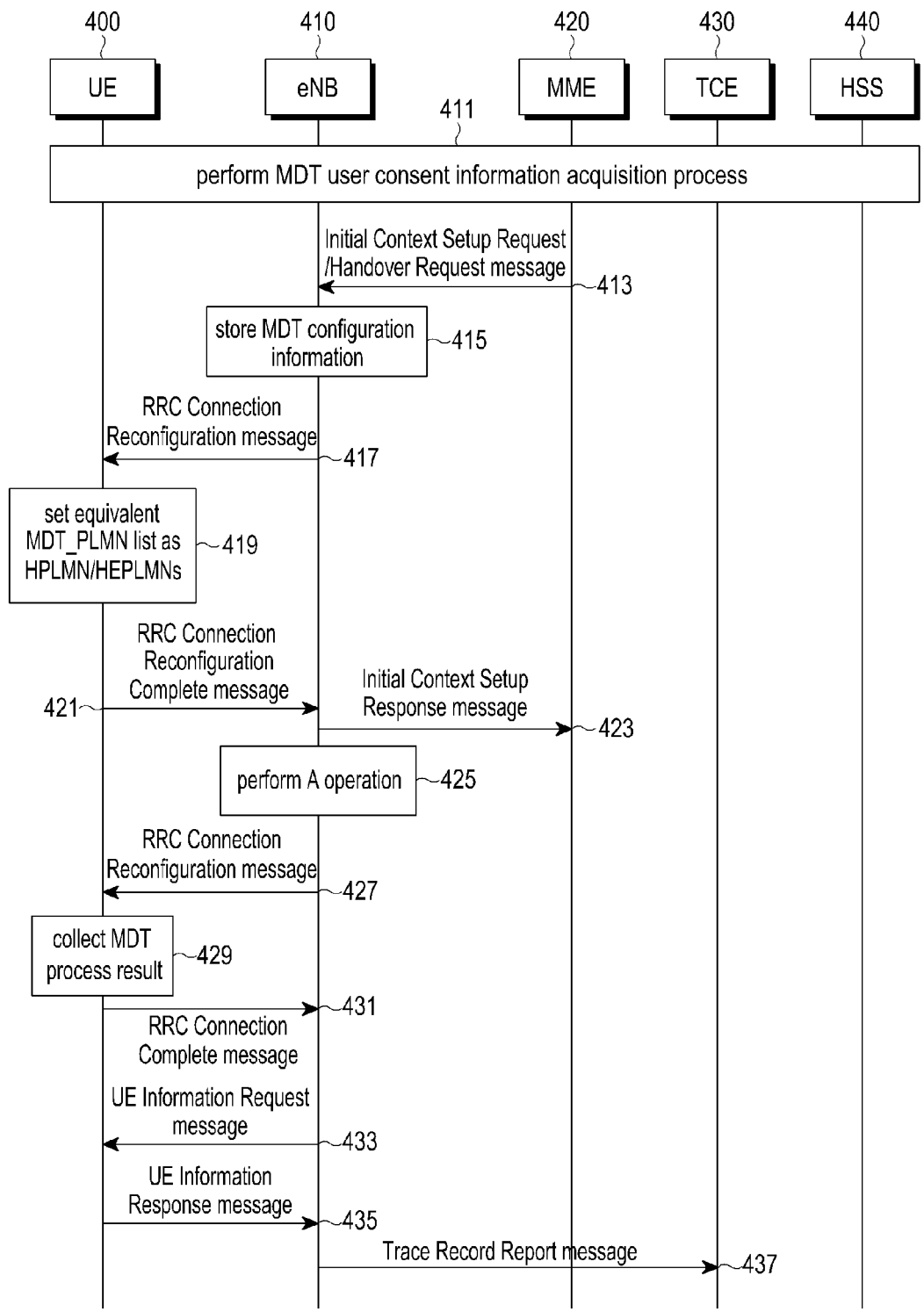
FIG. 4 is a signal flow diagram schematically illustrating performing an immediate MDT process in an EPS in accordance with the third embodiment of the present disclosure.

FIG. 4 is a signal flow diagram schematically illustrating performing an immediate MDT process in an EPS in accordance with the third embodiment of the present disclosure. The EPS includes a UE 400, an eNB 410, a MME 420, a TCE 430 and an HSS 440. The UE 400, the MME 420 and the HSS 440 perform an MDT user consent information acquisition process (step 411). The MDT user consent indication information acquisition process will be described.

The UE 400 transmits an Attach Request message to the MME 420. After receiving the Attach Request message from the UE 400, the MME 420 transmits a Location Update Request message to the HSS 440 in order to acquire subscriber information for the UE 400. After receiving the Location Update Request message from the MME 420, the HSS 440 detects whether the UE 400 consents to perform the MDT process, and transmits a Location Update ACK message, as a response message to the Location Update Request message, including the subscriber information of the UE 400 including information indicating whether the UE 400 consents to perform an MDT process according to the detection result.

After receiving the Location Update ACK message from the HSS 440, the MME 420 detects whether the UE 400 consents to perform the MDT process from the Location Update ACK message, and generates MDT user consent information according to the detection result. In FIG. 4, it will be assumed that the UE 400 consents to perform the MDT process, so the MDT user consent information indicates that the UE 400 consents to perform the MDT process.

After receiving the Location Update ACK message including the subscriber information indicating that the UE 400 consents to perform the MDT process from the HSS 440, the MME 420 stores the MDT user consent information generated according to the subscriber information as context information for the UE 400, and transmits the initial context setup request message including the MDT user consent information to eNB 410 while transferring an Attach Accept message to the UE 400 via the eNB 410. Afterwards the eNB 410 can command the UE 400 to perform an MDT process after receiving the initial UE context setup request message including the MDT user consent information from the MME 420.

The MME 420 generates an equivalent PLMN list including PLMN IDs of PLMNs set as equivalent PLMNs, and transmits the equivalent PLMN list to the UE 400. The equivalent PLMN list is transmitted to the UE 400 through an Attach Accept message. After receiving the Attach Accept message from the MME 420, the UE 400 detects equivalent PLMNs using the equivalent PLMN list included in the Attach Accept message. The UE 400 sets a registered PLMN as an MDT_PLMN and sets PLMNs corresponding to PLMN IDs included in the equivalent PLMN list as equivalent MDT_PLMNs if the eNB 410 commands the UE 400 to perform a radio network deployment state test process at step 417. Step 417 will be described as follow.

In FIG. 4, the registered PLMN of the UE 400 is set as the MDT_PLMN. However it will be understood by those of ordinary skill in the art that a PLMN which the UE 400 has selected can be set as the MDT_PLMN, not the registered PLMN of the UE 400. There can be various schemes for selecting a PLMN set as the MDT_PLMN, and the description of the various schemes for selecting the PLMN set as the MDT_PLMN will be omitted. Otherwise, if an MME of the UE 400 as a prior MME is changed to a new MME while the UE 400 performs a handover process, the new MME receives the MDT user consent information from the prior MME using the UE context information.

After the MDT user consent information acquisition process between the UE 400, the MME 420 and the HSS 440 has been performed, if the MME 420 is the prior MME, the MME 420 transmits an Initial Context Setup Request message to the eNB 410 (step 413). The Initial Context Setup Request message includes Trace Activation information, and the Trace Activation information includes Logged Measurement Configuration information. The Logged Measurement Configuration information has been described in FIG. 2. Otherwise, if the MME 420 is the new MME, the MME 420 transmits a Handover Request message to the eNB 410 (step 413). The Handover Request message includes Logged Measurement Configuration information.

After receiving the Initial Context Setup Request message or the Handover Request message from the MME 420, the eNB 410 stores the MDT Configuration information included in the Initial Context Setup Request message (step 415). The MDT Configuration information has been described in FIG. 2. Afterwards the eNB 410 transmits a RRC Connection Reconfiguration message to the UE 400 (step 417). The RRC Connection Reconfiguration message includes an MDT_ePLMN_request parameter requesting an equivalent MDT_PLMN list. After receiving the RRC Connection Reconfiguration message from the eNB 410, the UE 400 sets equivalent MDT_PLMNs as an HPLMN and HEPLMNs (step 419), and transmits a RRC Connection Reconfiguration Complete message as a response message to the RRC Connection Reconfiguration message to the eNB 410 (step 421). The RRC Connection Reconfiguration Complete message includes an equivalent MDT_PLMN list.

After receiving the RRC Connection Reconfiguration Complete message from the UE 400, the eNB 410 transmits an Initial Context Setup Response message as a response message to the Initial Context Setup Request message to the MME 420 (step 423). After transmitting the Initial Context Setup Response message, the eNB 610 sets a UE context as the equivalent MDT_PLMN list, checks an MDT Criteria, and determines whether a registered PLMN of the UE 400 is one of equivalent MDT_PLMNs corresponding to equivalent MDT_PLMN IDs included in the equivalent MDT_PLMN list (step 425). The operation of checking the MDT Criteria has been described in FIG. 2. It is noted that step 425 is illustrated as "perform A operation" in FIG. 4.

The eNB 410 transmits a RRC Connection Reconfiguration message to the UE 400 (step 427). The RRC Connection Reconfiguration message includes immediate MDT process information. The immediate MDT process information has been described in FIG. 2. After receiving the RRC Connection Reconfiguration message, the UE 400 determines whether an MDT_PLMN is a registered PLMN of the UE 400, performs an MDT process using an immediate MDT scheme if the MDT_PLMN is the registered PLMN of the UE 400, and collects an MDT process result (step 429). The UE 400 transmits a RRC Connection Reconfiguration Complete message as a response message to the RRC Connection Reconfiguration message to the eNB 410 (step 431).

After receiving the RRC Connection Reconfiguration Complete message from the UE 400, the eNB 410 transmits a UE Information Request message to the UE 400 (step 433). The UE Information Request message includes a logMeasReportReq parameter indicating that the eNB 410 requests the UE 400 to report the collected MDT process result. After receiving the UE Information Request message from the eNB 410, the UE 400 transmits a UE Information Response message including a logMeasReport parameter indicating the collected MDT process result to the eNB 410 (step 435). After receiving the UE Information Response message from the UE 400, the eNB 410 transmits a Trace Record Report message to the TCE 430 (step 437). The Trace Record Report message includes the logMeasReport parameter.

Figure 5A:
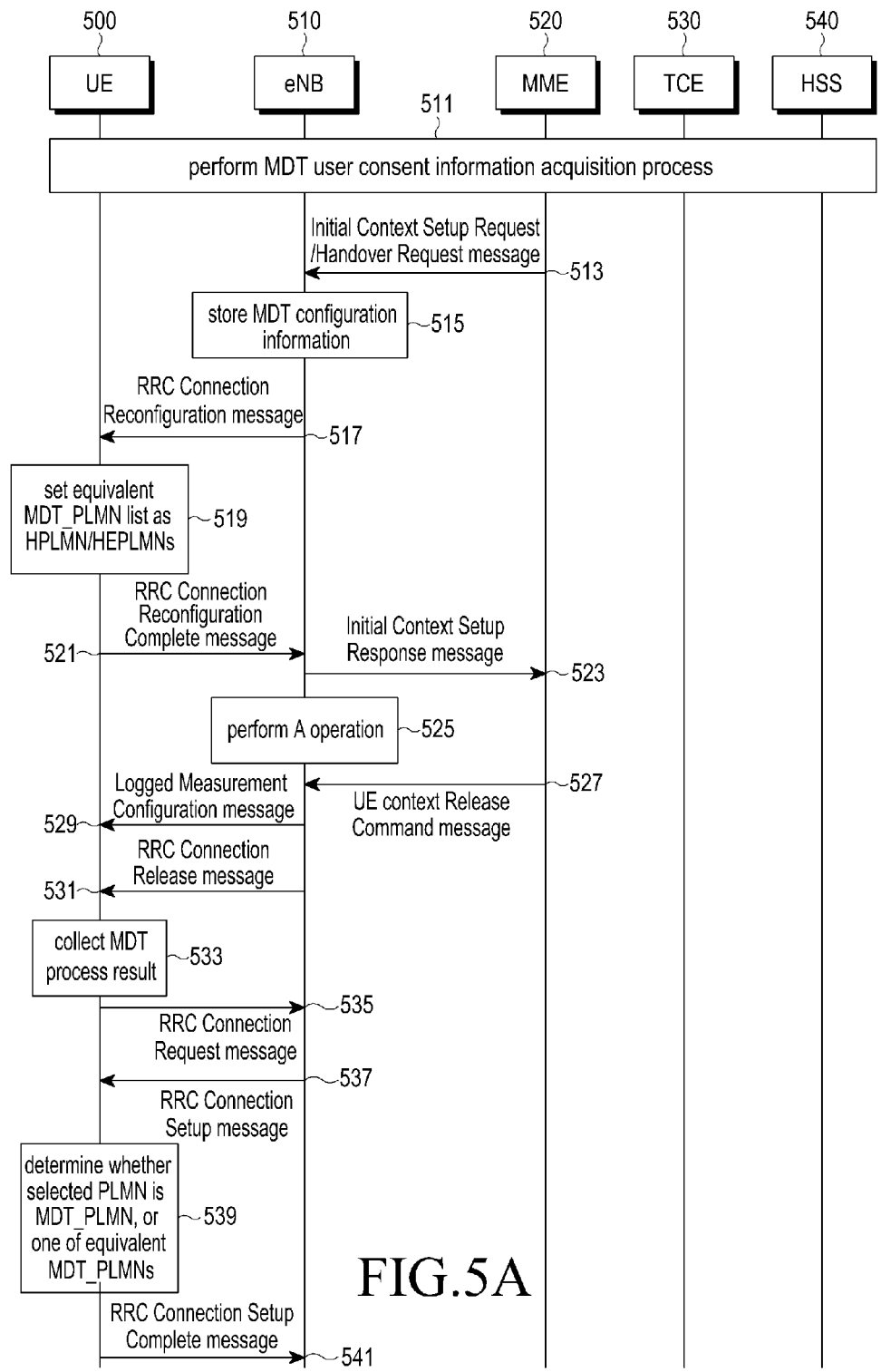
FIGS. 5A to 5B are signal flow diagrams schematically illustrating performing a logged MDT process in an EPS in accordance with the fourth embodiment of the present disclosure.
Figure 5B:
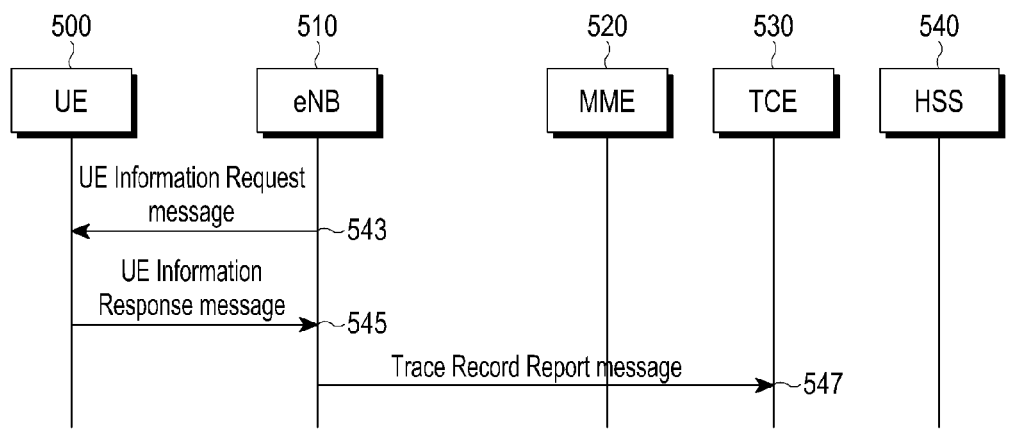

FIGS. 5A to 5B are signal flow diagrams schematically illustrating performing a logged MDT process in an EPS in accordance with the fourth embodiment of the present disclosure.

Referring to FIGS. 5A to 5B, the EPS includes a UE 500, an eNB 510, a MME 520, a TCE 530 and an HSS 540.

The operations of steps 511 to 525 in FIGS. 5A to 5B are identical to those of steps 411 to 425 shown in FIG. 4, and the operations of steps 543 to 547 is identical to those of steps 433 to 437 shown in FIG. 4, so the detailed description of the operation of the steps 511 to 525 and 543 to 547 will be omitted.

The MME 520 transmits a UE context Release Command message to the eNB 510 (step 527). After receiving the UE context Release Command message from the MME 520, the eNB 510 transmits a Logged Measurement Configuration message to the UE 500 (step 529). The Logged Measurement Configuration message includes logged MDT process information. The logged MDT process information has been described in FIG. 3.

The eNB 510 transmits a RRC Connection Release message to the UE 500 (step 531). After receiving the RRC Connection Release message from the eNB 510, the UE 500 releases a RRC connection established between the UE 500 and the eNB 510, and operates in an idle mode according to the RRC connection release. The UE 500 operating in the idle mode determines whether an MDT_PLMN is a registered PLMN, performs an MDT process using a logged MDT scheme if the MDT_PLMN is the registered PLMN, and collects an MDT process result according to the MDT process performance (step 533).

In certain embodiments, if the UE 500 wants to reestablish a RRC connection with the eNB 510 in the state which a RRC connection between the UE 500 and the eNB 510 is released, the UE 500 transmits a RRC Connection Request message to the eNB 510 (step 535). It will be understood by those of ordinary skill in the art that a timing point at which the UE 500 reestablishes the RRC connection with the eNB 510 is not limited hereto.

After receiving the RRC Connection Request message from the UE 500, the eNB 510 detects that the UE 500 requests a RRC connection, and transmits a RRC Connection Setup message requesting setup of the RRC connection to the UE 500 (step 537).

After receiving the RRC Connection Setup message from the eNB 510, the UE 500 determines whether a selected PLMN is an MDT_PLMN of the UE 500, or one of equivalent MDT_PLMNs corresponding to equivalent MDT_PLMN IDs included in the equivalent MDT_PLMN list (step 539). If the MME 520 is the prior MME, the UE 500 determines whether the selected PLMN is the MDT_PLMN, and if the MME 520 is the new MME, the UE 500 determines whether the selected PLMN is one of the equivalent MDT_PLMNs corresponding to the equivalent MDT_PLMN IDs included in the equivalent MDT_PLMN list.

The reason why the UE 500 compares the selected PLMN with the MDT_PLMN or one of the equivalent MDT_PLMNs is that the UE 500 can set the MDT_PLMN as the selected PLMN, not the registered PLMN. There can be various schemes for selecting a PLMN set as the MDT_PLMN, and the description of the various schemes for selecting the PLMN set as the MDT_PLMN will be omitted. In this embodiment, the selected PLMN is the MDT_PLMN if the MME 520 is the prior MME, and the selected PLMN is one of the equivalent MDT_PLMNs if the MME 520 is the new MME.

The UE 500 transmits a RRC Connection Setup Complete message as a response message to the RRC Connection Setup message to the eNB 510 (step 541). The RRC Connection Setup Complete message includes a logMeasAvailable parameter indicating an available MDT process result. A value of the logMeasAvailable parameter is set as "true" if the selected PLMN is the MDT_PLMN when the MME 520 is the prior MME, and if the selected PLMN is one of the equivalent MDT_PLMNs when the MME 520 is the new MME.

Figure 6A:
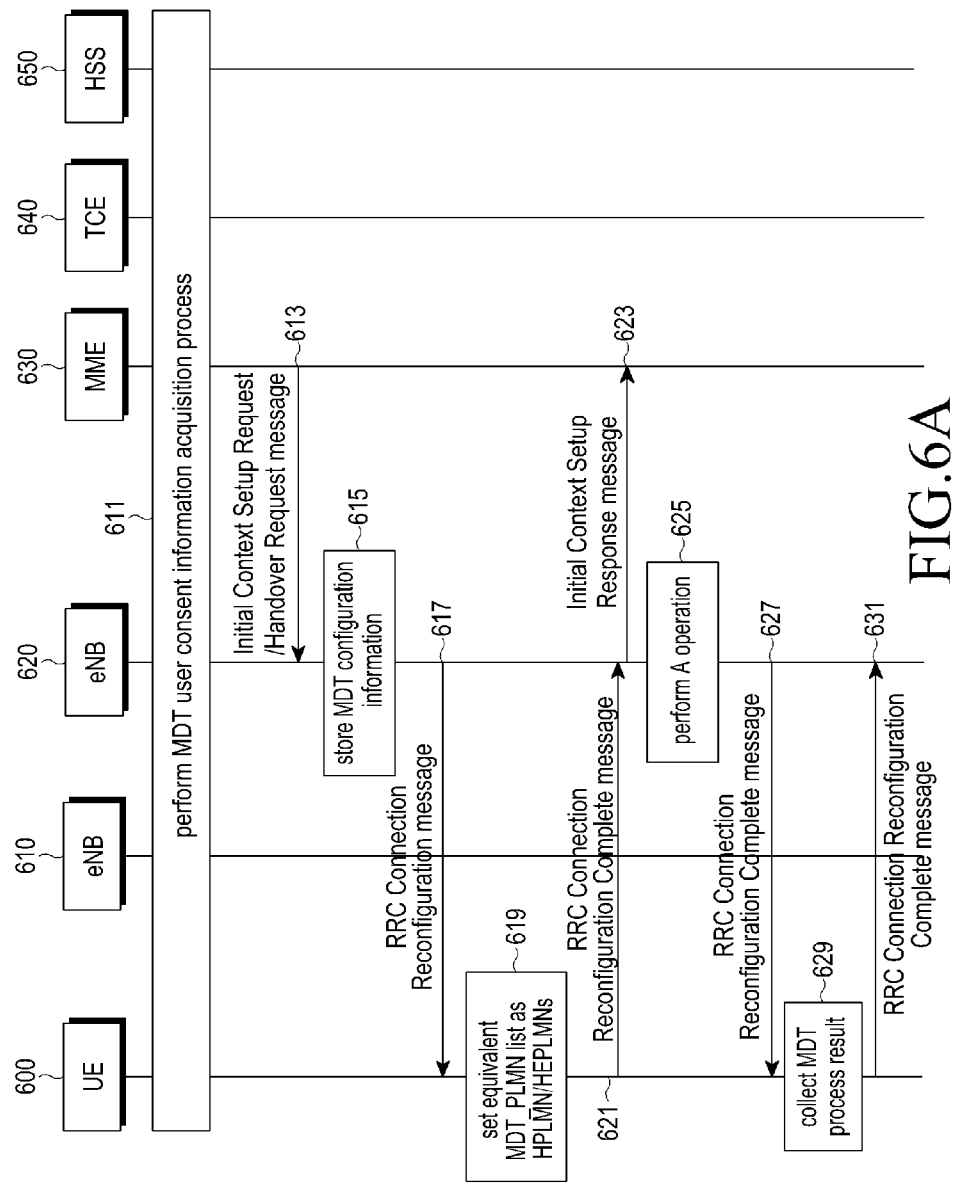
FIGS. 6A to 6B are signal flow diagrams schematically illustrating performing an immediate MDT process in an EPS in accordance with the fifth embodiment of the present disclosure.
Figure 6B:
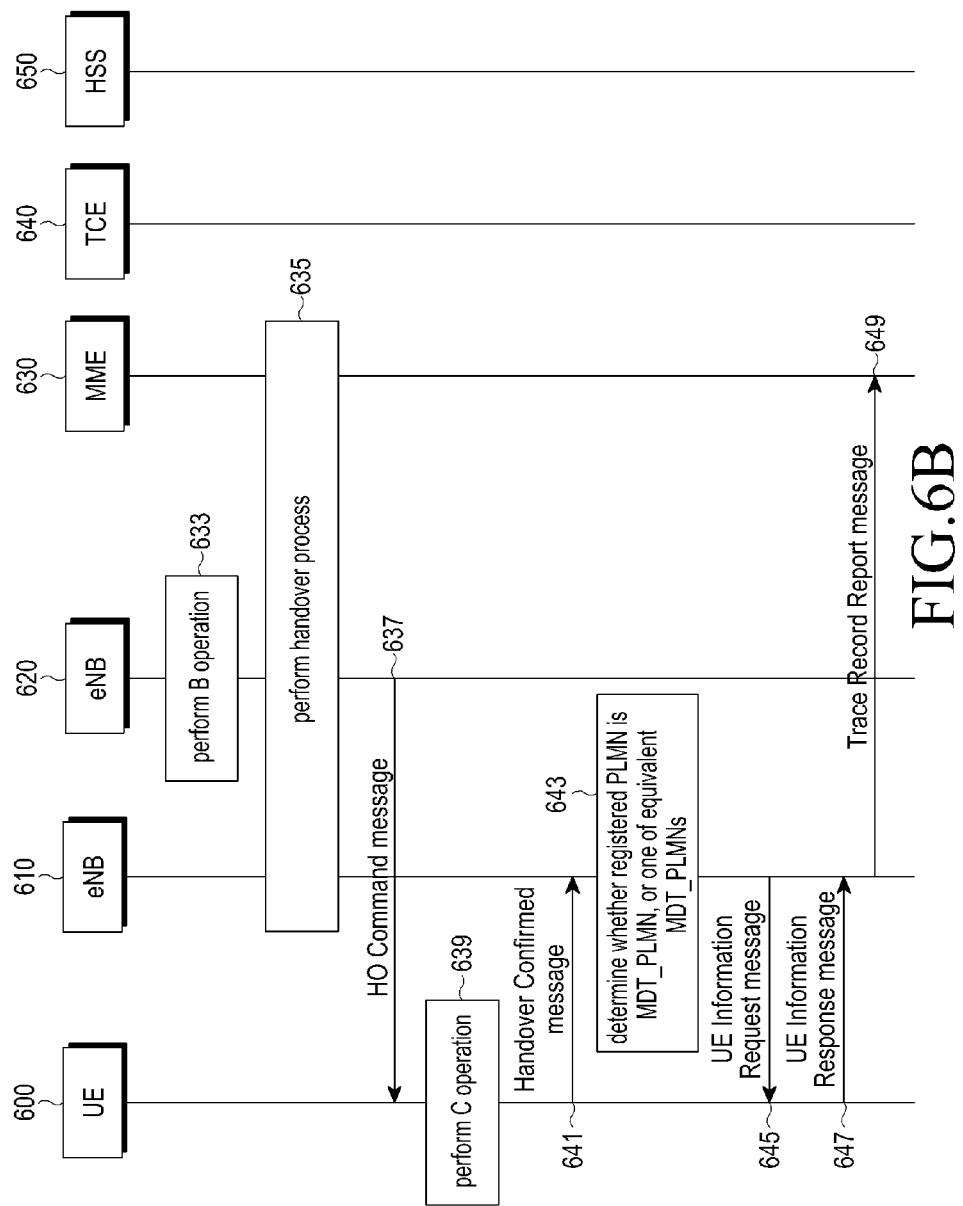

FIGS. 6A to 6B are signal flow diagrams schematically illustrating performing an immediate MDT process in an EPS in accordance with the fifth embodiment of the present disclosure. The EPS includes a UE 600, an eNB 610, an eNB 620, a MME 630, a TCE 640 and an HSS 650.

An operation of performing an immediate MDT process illustrated in FIGS. 6A to 6B is an operation of performing an immediate MDT process on an inter PLMN handover on which a PLMN is changed. In this embodiment, it will be assumed that the eNB 610 is a source eNB, and the eNB 620 is a target eNB.

The UE 600, the MME 630 and the HSS 650 perform an MDT user consent information acquisition process (step 611). The MDT user consent information acquisition process will be described.

The UE 600 transmits an Attach Request message to the MME 630. After receiving the Attach Request message from the UE 600, the MME 630 transmits a Location Update Request message to the HSS 650 in order to acquire subscriber information for the UE 600. After receiving the Location Update Request message from the MME 630, the HSS 650 detects whether the UE 600 consents to perform the MDT process, and transmits a Location Update ACK message, as a response message to the Location Update Request message, including the subscriber information of the UE 600 including information indicating whether the UE 600 consents to perform an MDT process according to the detection result.

After receiving the Location Update ACK message from the HSS 650, the MME 630 detects whether the UE 600 consents to perform the MDT process from the Location Update ACK message, and generates MDT user consent information according to the detection result. In this embodiment, it will be assumed that the UE 600 has consented to perform the MDT process, so the MDT user consent information indicates that the UE 600 has consented to perform the MDT process.

After receiving the Location Update ACK message including the subscriber information indicating that the UE 600 consents to perform the MDT process from the HSS 650, the MME 630 stores the MDT user consent information generated according to the subscriber information as context information for the UE 600, and transmits the initial context setup request message including the MDT user consent information to eNB 620 while transferring an Attach Accept message to the UE 600 via the eNB 620. The eNB 620 can later command the UE 600 to perform an MDT process after receiving the initial UE context setup request message including the MDT user consent information from the MME 630.

The MME 630 generates an equivalent PLMN list including PLMN IDs of PLMNs set as equivalent PLMNs, and transmits the equivalent PLMN list to the UE 600. The equivalent PLMN list is transmitted to the UE 600 through an Attach Accept message. After receiving the Attach Accept message from the MME 630, the UE 600 detects equivalent PLMNs using the equivalent PLMN list included in the Attach Accept message. The UE 600 sets a registered PLMN as an MDT_PLMN and sets PLMNs corresponding to PLMN IDs included in the equivalent PLMN list as equivalent MDT_PLMNs if the eNB 620 commands the UE 600 to perform a radio network deployment state test process at step 617. Step 617 will be described as follow.

In this embodiment, the registered PLMN of the UE 600 is set as the MDT_PLMN. However, it will be understood by those of ordinary skill in the art that a PLMN which the UE 600 has selected can be set as the MDT_PLMN, not the registered PLMN of the UE 600. There can be various schemes for selecting a PLMN set as the MDT_PLMN, and the description of the various schemes for selecting the PLMN set as the MDT_PLMN will be omitted.

Otherwise, if an prior MME as an MME of the UE 600 is changed to a new MME while the UE 600 performs a handover process, the new MME receives the MDT user consent information from the prior MME using a UE context.

After the MDT user consent information acquisition process between the UE 600, the MME 630 and the HSS 650 has been performed, if the MME 630 is the prior MME, the MME 630 transmits an Initial Context Setup Request message to the eNB 620 (step 613). The Initial Context Setup Request message includes Trace Activation information, and the Trace Activation information includes Logged Measurement Configuration information. The Logged of Measurement Configuration information has been described in FIG. 2.

Otherwise, if the MME 630 is the new MME, the MME 630 transmits a Handover Request message to the eNB 620 (step 613). The Handover Request message includes Logged Measurement Configuration information.

After receiving the Initial Context Setup Request message or the Handover Request message from the MME 630, the eNB 620 stores the MDT Configuration information included in the Initial Context Setup Request message (step 615). The MDT Configuration information has been described in FIG. 2.

Afterwards the eNB 620 transmits a RRC Connection Reconfiguration message to the UE 600 (step 617). The RRC Connection Reconfiguration message includes an MDT_ePLMN_request parameter requesting an equivalent MDT_PLMN list. After receiving the RRC Connection Reconfiguration message from the eNB 620, the UE 600 sets an equivalent MDT_PLMN as an HPLMN and HEPLMNs (step 619), and transmits a RRC Connection Reconfiguration Complete message as a response message to the RRC Connection Reconfiguration message to the eNB 620 (step 621). The RRC Connection Reconfiguration Complete message includes an equivalent MDT_PLMN list.

After receiving the RRC Connection Reconfiguration Complete message from the UE 600, the eNB 620 transmits an Initial Context Setup Response message as a response message to the Initial Context Setup Request message to the MME 630 (step 623). After transmitting the Initial Context Setup Response message, the eNB 620 sets a UE context as the equivalent MDT_PLMN list, checks an MDT Criteria, and determines whether a registered PLMN of the UE 600 is one of equivalent MDT_PLMNs corresponding to equivalent MDT_PLMN IDs included in the equivalent MDT_PLMN list (step 625). The operation of checking the MDT Criteria has been described in FIG. 2. It is noted that step 625 is described as "perform A operation" in FIGS. 6A to 6B.

The eNB 620 transmits a RRC Connection Reconfiguration message to the UE 600 (step 627). The RRC Connection Reconfiguration message includes immediate MDT process information. The immediate MDT process information has been described in FIG. 2. After receiving the RRC Connection Reconfiguration message, the UE 600 determines whether an MDT_PLMN is a registered PLMN of the UE 600, performs an MDT process using an immediate MDT scheme if the MDT_PLMN is the registered PLMN of the UE 600, and collects an MDT process result (step 629). The UE 600 transmits a RRC Connection Reconfiguration Complete message as a response message to the RRC Connection Reconfiguration message to the eNB 620 (step 631).

Upon detecting the necessity for a handover of the UE 600, the eNB 620 determines whether a target PLMN is a registered PLMN of the UE 600 or one of equivalent MDT_PLMNs, and performs an operation according to the detection result (step 633). That is, the eNB 620 includes the MDT configuration information, the MDT process result and the equivalent MDT_PLMN list in the Handover Request message if the target PLMN is the registered PLMN of the UE 600 or one of the equivalent MDT_PLMNs.

In certain embodiments, the eNB 620 discard the MDT process result received from the UE 600, and does not include the MDT configuration information the equivalent MDT_PLMN list in the Handover Required message and the Handover Request message if the target PLMN is not the registered PLMN of the UE 600, nor one of the equivalent MDT_PLMNs. It is noted that step is described as "perform B operation" in FIGS. 6A to 6B.

Afterwards, the eNB 620 performs a handover process with the eNB 610 (step 635). The description of the handover process will be omitted. The eNB 620 transmits Handover Command (HO Command) message to the UE 600. The HO Command message is a message indicating that the eNB 620 commands the UE 600 to handover from the eNB 620 to the eNB 610. After receiving the HO Command message from the eNB 620, the UE 600 determines whether the target PLMN is the registered PLMN of the UE 600 and one of the equivalent MDT_PLMNs, and performs a related operation according to the determined result (step 639). That is, the UE 600 continuously performs the immediate MDT process if the target PLMN is the registered PLMN of the UE 600 or one of the equivalent MDT_PLMNs.

In certain embodiments, the UE 600 stops performing the immediate MDT process if the target PLMN is not the registered PLMN of the UE 600, nor one of the equivalent MDT_PLMNs. It is noted that step 639 is described as "perform C operation" in FIGS. 6A to 6B.

The UE 600 transmits a Handover Confirmed message to the eNB 610 (step 641). After receiving the Handover Confirmed message from the UE 600, the eNB 610 determines whether a registered PLMN of the UE 600 is the MDT_PLMN or one of the equivalent MDT_PLMNs (step 643). It will be assumed that the registered PLMN of the UE 600 is the MDT_PLMN or one of the equivalent MDT_PLMNs in FIGS. 6A to 6B.

The eNB 610 transmits a UE Information Request message to the UE 600 (step 645). The UE Information Request message includes a logMeasReportReq parameter indicating that the eNB 610 requests the UE 600 to report the collected MDT process result. After receiving the UE Information Request message from the eNB 610, the UE 600 transmits a UE Information Response message including a logMeasReport parameter indicating the collected MDT process result to the eNB 610 (step 647). After receiving the UE Information Response message from the UE 600, the eNB 610 transmits a Trace Record Report message to the TCE 640 (step 649). The Trace Record Report message includes the logMeasReport parameter.

Figure 7:
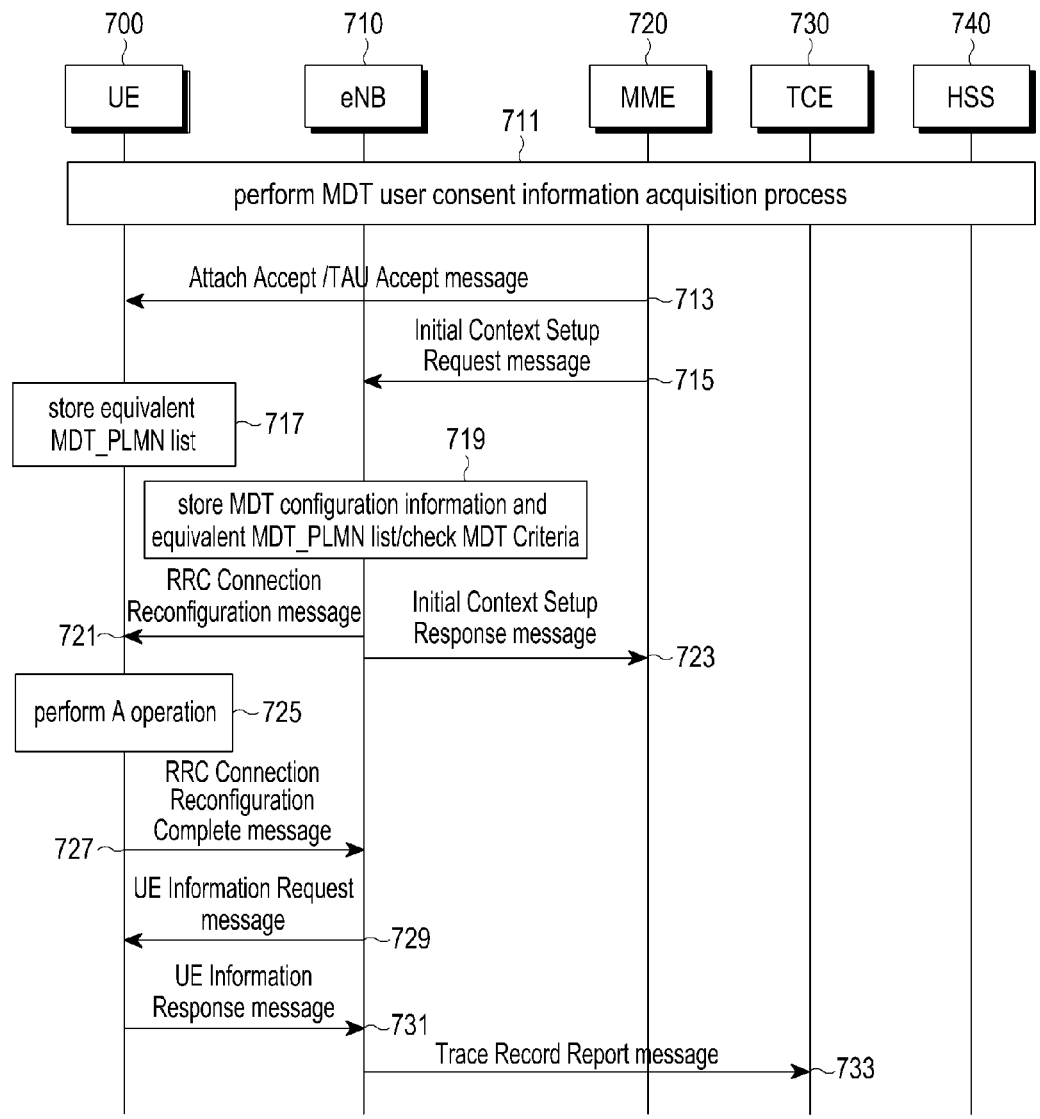
FIG. 7 is a signal flow diagram schematically illustrating performing an immediate MDT process in an EPS in accordance with the sixth embodiment of the present disclosure.

FIG. 7 is a signal flow diagram schematically illustrating performing an immediate MDT process in an EPS in accordance with the sixth embodiment of the present disclosure.

Referring to FIG. 7, the EPS includes a UE 700, an eNB 710, a MME 720, a TCE 730 and an HSS 740.

The UE 700, the MME 720 and the HSS 740 perform a MDT user consent information acquisition process (711). The MDT user consent information acquisition process will be described.

The UE 700 transmits an Attach Request message to the MME 720. After receiving the Attach Request message from the UE 700, the MME 720 transmits a Location Update Request message to the HSS 740 in order to acquire subscriber information for the UE 700. After receiving the Location Update Request message from the MME 720, the HSS 740 detects whether the UE 700 consents to perform the MDT process, and transmits a Location Update ACK message, as a response message to the Location Update Request message, including the subscriber information of the UE 700 including information indicating whether the UE 700 consents to perform an MDT process according to the detection result.

After receiving the Location Update ACK message from the HSS 740, the MME 720 detects whether the UE 700 consents to perform the MDT process from the Location Update ACK message, and generates MDT user consent information according to the detection result. In FIG. 7, it will be assumed that the UE 700 consents to perform the MDT process, so the MDT user consent information indicates that the UE 700 consents to perform the MDT process.

After receiving the Location Update ACK message including the subscriber information indicating that the UE 700 consents to perform the MDT process from the HSS 740, the MME 720 stores the MDT user consent information generated according to the subscriber information as context information for the UE 700.

The MME 720 transmits an Attach Accept/Tracking Area Update (TAU) Accept message to the UE 700 (step 713). The Attach Accept/TAU Accept message includes an equivalent MDT_PLMN list including equivalent MDT_PLMN IDs of equivalent MDT_PLMNs to which the UE 700 reports an MDT process result after performing an MDT process.

As described above, the MME 720 transmits the equivalent MDT_PLMN list using the Attach Accept/TAU Accept message, however it is possible that the MME 720 transmits the equivalent MDT_PLMN list to eNB 710 and the eNB 710 transmits the equivalent MDT_PLMN list received from MME 720 to the UE 700 using RRC message. Namely, when the MME 720 does not include the equivalent MDT_PLMN list including equivalent MDT_PLMN IDs of equivalent MDT_PLMNs in attach accept/TAU accept message, the MME 720 delivers the equivalent MDT_PLMN list to which the UE 700 reports an MDT process result after performing an MDT process in the initial context setup request message to eNB 710 while sending Attach accept/TAU accept message via eNB 710 to the UE 700. It will be understood by those of ordinary skill in the art that the RRC message in which the equivalent MDT_PLMN list is included can be implemented in various forms. The form is RRC connection reconfiguration message (step 721). After receiving the Attach Accept/TAU Accept message or the RRC message, the UE 700 stores the equivalent MDT_PLMN list included in the Attach Accept/TAU Accept message or the RRC message (step 717). The MME 720 can transmit the equivalent MDT_PLMN list at step 715, or steps 717 and 723. On the other hand, the UE receives the equivalent MDT_PLMN list from eNB using the RRC message during commanding MDT to the UE (715 and 721). When the UE 700 receives the equivalent MDT_PLMN list from eNB 710 using the RRC message, the UE 700 stores the equivalent MDT_PLMN list and uses the store equivalent MDT_PLMN list to decide whether to report the MDT processing result or not.

The MME 720 transmits an Initial Context Setup Request message to the eNB 710 (step 715). The Initial Context Setup Request message includes an equivalent MDT_PLMN list set by the MME 720, Trace Activation information, and the Trace Activation information includes Logged Measurement Configuration information. The Logged Measurement Configuration information has been described in FIG. 2.

As described above, the equivalent MDT_PLMN list is included in the Logged Measurement Configuration information. However, the equivalent MDT_PLMN list can be included in a Handover Restriction List (HLR) list included in the Initial Context Setup Request message. That is, the equivalent MDT_PLMN list is transmitted along with the MDT configuration information, and the equivalent MDT_PLMN can be included in the Initial Context Setup Request message in various forms.

After receiving the Initial Context Setup Request message from the MME 720, the eNB 710 stores the MDT configuration information and the equivalent MDT_PLMN list, and checks an MDT Criteria (step 719). The operation of checking the MDT Criteria has been described in FIG. 2.

The eNB 710 transmits a RRC Connection Reconfiguration message to the UE 700 (step 721). The RRC Connection Reconfiguration message includes immediate MDT process information and the equivalent MDT_PLMN list. The immediate MDT process information has been described in FIG. 2. The eNB 710 transmits an Initial Context Setup Response message as a response message to the Initial Context Setup Request message (step 723). As not described in FIG. 7, it will be understood by those of ordinary skill in the art that the UE stores the equivalent MDT_PLMN list if the UE 700 receives the equivalent MDT_PLMN list through the RRC Connection Reconfiguration message.

The UE 700 receives the equivalent MDT_PLMN list through the RRC Connection Reconfiguration message or one of the RRC Connection Reconfiguration and the Attach Accept message/TAU Accept message, stores the received equivalent MDT_PLMN list, and sets the received equivalent MDT_PLMN list as an equivalent MDT_PLMN list.

The UE 700 determines whether a registered PLMN of the UE 700 is one of equivalent MDT_PLMNs. If the registered PLMN of the UE 700 is one of the equivalent MDT_PLMNs, the UE 700 sets performs an immediate MDT process. If the registered PLMN of the UE 700 is not the MDT_PLMN nor one of the equivalent MDT_PLMNs, the UE 700 does not perform more operations. It is noted that step 725 is described as "perform A operation" in FIG. 7. The UE 700 transmits a RRC Connection Reconfiguration Complete message to the eNB 710 (step 727).

After sending the RRC Reconfiguration Complete message to eNB 710 the UE 700 performs the MDT as requested by the eNB 710 After requesting to process the MDT, the eNB 710 can request the MDT process result. When the eNB 710 requests the MDT process result, the eNB 710 transmits a UE Information Request message to the UE 700 (step 729). The UE Information Request message includes a logMeasReportReq parameter indicating that the eNB 710 requests the UE 700 to report the collected MDT process result. After receiving the UE Information Request message from the eNB 710, the UE 700 transmits a UE Information Response message including a logMeasReport parameter indicating the collected MDT process result to the eNB 710 (step 731). After receiving the UE Information Response message from the UE 700, the eNB 710 transmits a Trace Record Report message to the TCE 730 (step 733). The Trace Record Report message includes the logMeasReport parameter.

Although not illustrated in FIG. 7, the following operation will be additionally performed.

After the MDT user consent information acquisition process between the UE 700, the MME 720 and the HSS 740 has been performed, the MME 720 determines whether the MDT_PLMN of the UE 700 is identical to a PLMN of a GUMMEI as an operator PLMN of the MME 720, and the equivalent MDT_PLMNs of the UE 700 are identical to equivalent MDT PLMNs of the PLMN of the GUMMEI. In FIG. 7, it will be assumed that the MDT_PLMN of the UE 700 is identical to the PLMN of the GUMMEI, and the equivalent MDT_PLMNs of the UE 700 are identical to the equivalent MDT_PLMNs of the PLMN of the GUMMEI.

The MME 720 determines whether the registered PLMN of the UE 700 is identical to the MDT_PLMN or one of the equivalent MDT_PLMNs, and performs related operation according to the determined result. That is, the MME 720 generates MDT configuration information if the registered PLMN of the UE 700 is identical to the MDT_PLMN or one of the equivalent MDT_PLMNs. Alternatively, the MME 720 does not perform more operations if the registered PLMN of the UE 700 is not identical to the MDT_PLMN nor one of the equivalent MDT_PLMNs.

Figure 8:
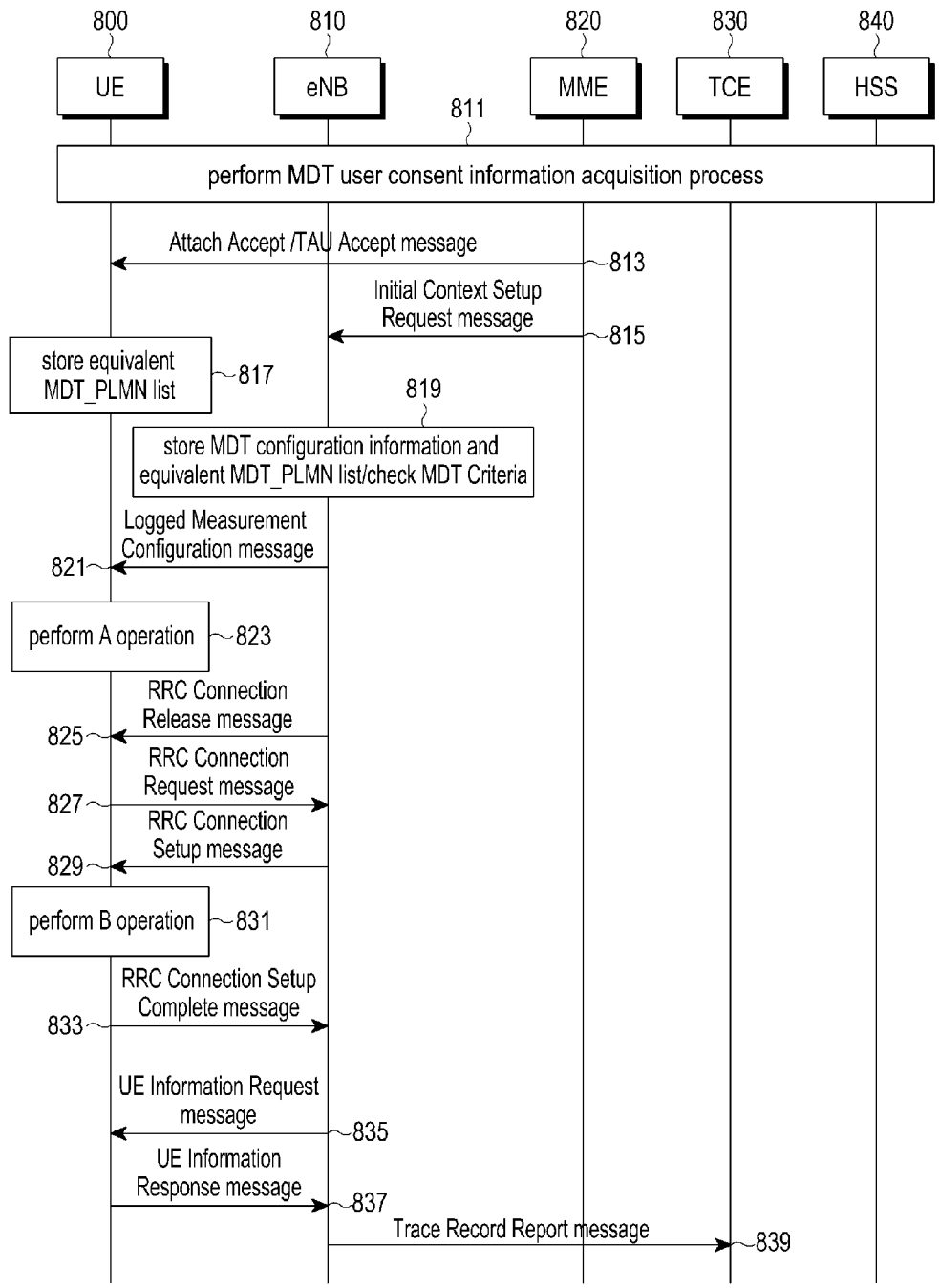
FIG. 8 is a signal flow diagram schematically illustrating performing a logged MDT process in an EPS in accordance with the seventh embodiment of the present disclosure.

FIG. 8 is a signal flow diagram schematically illustrating performing a logged MDT process in an EPS in accordance with the seventh embodiment of the present disclosure.

The EPS includes a UE 800, an eNB 810, a MME 820, a TCE 830 and an HSS 840.

The operations of steps 811 to 819 in FIG. 8 are identical to those of steps 711 to 719 in FIG. 7, and the operations of steps 835 to 839 are identical to those of steps 729 to 733 in FIG. 7, so the detailed description of the operations of the steps 811 to 819 and 835 to 839 will be omitted.

After storing MDT configuration information and an equivalent MDT_PLMN list, and checking an MDT Criteria, the eNB 810 transmits a Logged Measurement Configuration message to the UE 800 (step 821). The Logged Measurement Configuration message includes logged MDT process information need for performing a logged MDT process and an equivalent MDT_PLMN list received through the Initial Context Setup Request message from the MME 820.

The UE 800 receives an equivalent MDT_PLMN list from the eNB 810 through one of a Logged Measurement Configuration message or an Attach accept message/TAU accept message. The UE 800 can receive the equivalent MDT_PLMN list using other RRC message, and it will be understood by those of ordinary skill in the art that the RRC message in which the equivalent MDT_PLMN list is included can be implemented in various forms.

The received equivalent MDT_PLMN list is stored in the UE 800. Afterwards the UE 800 uses the stored equivalent MDT_PLMN list as a determination criteria upon performing a logged MDT process and reporting a logged MDT process performance result.

The UE 800 determines whether a PLMN of a cell which the UE 800 camps, "PLMN A", is the MDT_PLMN, or whether the PLMN A is included in the equivalent MDT_PLMNs. If the PLMN A is the MDT_PLMN, or the PLMN A is included in the equivalent MDT_PLMNs, the UE 800 determines the PLMN A is a PLMN in which the UE 800 should perform the logged MDT process, and performs the logged MDT process using the received logged MDT process information. If the PLMN A is not the MDT_PLMN, and the PLMN A is not included in the equivalent MDT_PLMNs, the UE 800 does not perform more operations (step 823). It is noted that step 823 is illustrated as "perform A operation" in FIG. 8. Step 823 will be continuously performed while the UE is idle.

The eNB 810 transmits a RRC Connection Release message to the UE 800 (step 825). After receiving the RRC Connection Release message from the eNB 810, the UE 800 releases a RRC connection established between the UE 800 and the eNB 810, and operates in an idle mode according to the RRC connection release.

The UE 800 operating in the idle mode performs the logged MDT process. The UE 800 performs the logged MDT process by comparing the logged MDT process information and a PLMN.

In certain embodiments, if the UE 800 wants to reestablish a RRC connection with the eNB 810 in the state which the UE 800 does not have any RRC connection with eNB 810, the UE 800 transmits a RRC Connection Request message to the eNB 810 (step 827). It will be understood by those of ordinary skill in the art that a timing point at which the UE 800 reestablishes the RRC connection with the eNB 810 is not limited hereto. After receiving the RRC Connection Request message from the UE 800, the eNB 810 transmits a RRC Connection Setup requesting a RRC connection setup to the UE 800 (step 829).

After receiving the RRC Connection Setup message, the UE 800 determines whether a PLMN of a related cell is an MDT_PLMN or one of equivalent MDT_PLMNs, and performs a related operation according to the determined result (step 831). That is, the UE 800 sets a value of a logMeasAvailable parameter as "true" if the PLMN of the related cell is the MDT_PLMN or one of the equivalent MDT_PLMNs. Alternatively, the UE 800 sets a value of the logMeasAvailable parameter as "false" if the PLMN of the related cell is not the MDT_PLMN, nor one of the equivalent MDT_PLMNs. It will be noted that the step 831 is illustrated as "perform C operation" in FIG. 8.

The UE 800 transmits a RRC Connection Setup Complete message as a response message to the RRC Connection Setup message to the eNB 810 (step 833). The RRC Connection Setup Complete message includes the logMeasAvailable parameter.

When the eNB 810 receives the RRC Connection Setup Complete message including the logMeasAvailable parameter configured as true, the eNB 810 requests the MDT process result by sending UE information request message (step 835) to the UE 800. Then, upon receiving the UE information request message, the UE 800 reports the MDT process result. After receiving the UE Information Response message from the UE 800, the eNB 810 transmits a Trace Record Report message to the TCE 830 (step 839). The Trace Record Report message includes the logMeasReport parameter.

Figure 9A:
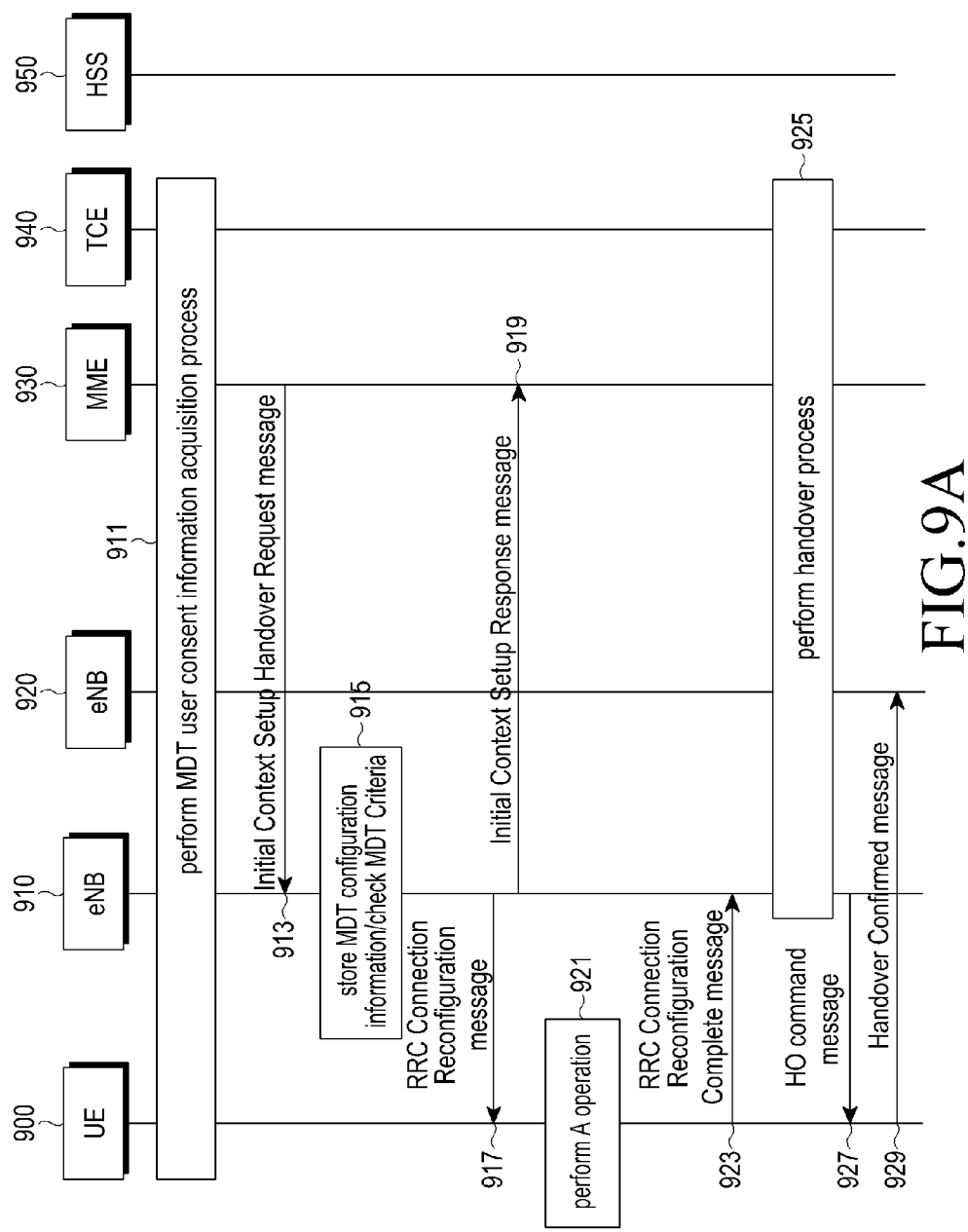
FIGS. 9A to 9B are signal flow diagrams schematically illustrating performing an immediate MDT process in an EPS in accordance with the eighth embodiment of the present disclosure.
Figure 9B:
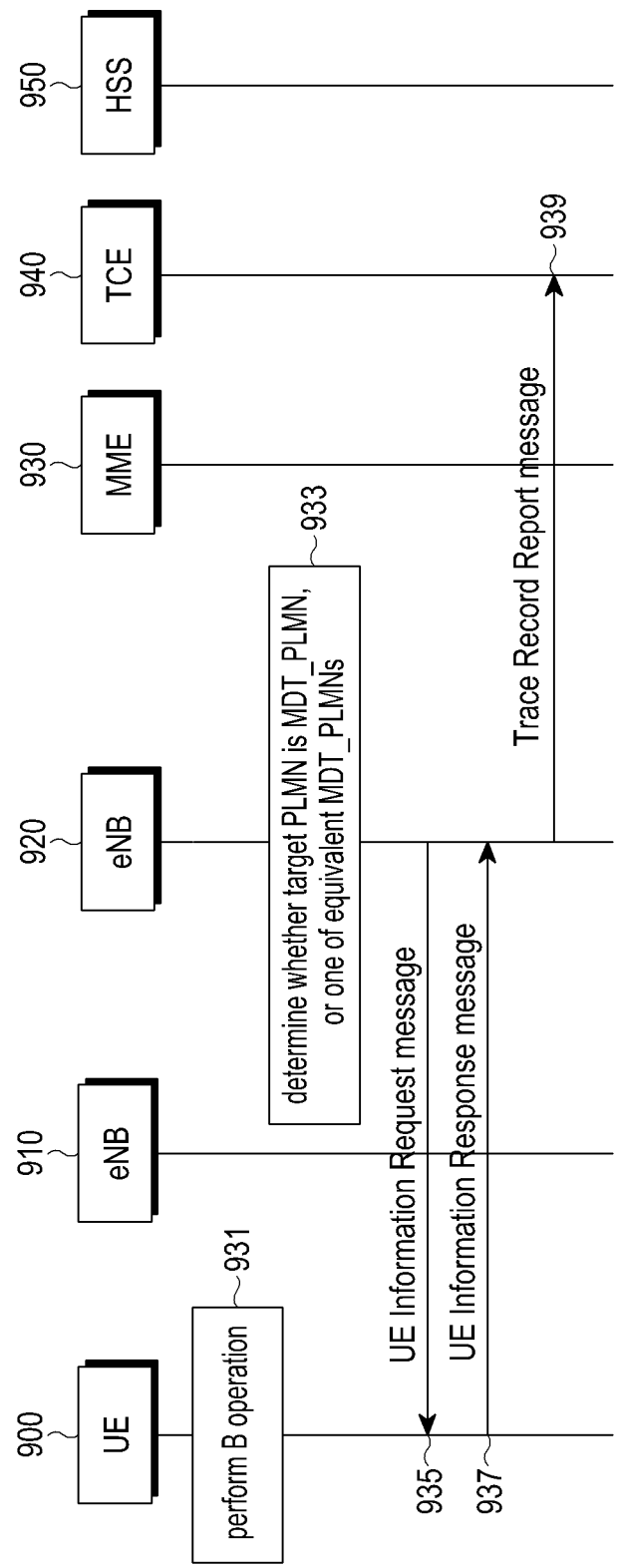

FIGS. 9A to 9B are signal flow diagrams schematically illustrating performing an immediate MDT process in an EPS in accordance with the eighth embodiment of the present disclosure. The EPS includes a UE 900, an eNB 910, an eNB 920, a MME 930, a TCE 940 and an HSS 950.

The UE 900, the MME 930 and the HSS 950 perform a MDT user consent information acquisition process (step 911). The MDT user consent information acquisition process will be described.

The UE 900 transmits an Attach Request message to the MME 930. After receiving the Attach Request message from the UE 900, the MME 930 transmits a Location Update Request message to the HSS 950 in order to acquire subscriber information for the UE 900. After receiving the Location Update Request message from the MME 930, the HSS 950 detects whether the UE 900 consents to perform the MDT process, and transmits a Location Update ACK message, as a response message to the Location Update Request message, including the subscriber information of the UE 900 including information indicating whether the UE 900 consents to perform an MDT process according to the detection result.

After receiving the Location Update ACK message from the HSS 950, the MME 930 detects whether the UE 900 consents to perform the MDT process from the Location Update ACK message, and generates MDT user consent information according to the detection result. In FIGS. 9A to 9B, it will be assumed that the UE 900 consents to perform the MDT process, so the MDT user consent information indicates that the UE 900 consents to perform the MDT process.

After receiving the Location Update ACK message including the subscriber information indicating that the UE 900 consents to perform the MDT process from the HSS 950, the MME 930 stores the MDT user consent information generated according to the subscriber information as context information for the UE 900, and transmits the initial context setup request message including the MDT user consent information to eNB 910 while transferring an Attach Accept message including to the UE 900 via the eNB 910. The eNB 910 can later command the UE 900 to perform an MDT process after receiving the initial UE context setup request message including the MDT user consent information from the MME 930.

The MME 930 generates an equivalent PLMN list including PLMN IDs of PLMNs set as equivalent PLMNs, and transmits the equivalent PLMN list to the UE 900. The equivalent PLMN list is transmitted to the UE 900 through an Attach Accept message. After receiving the Attach Accept message from the MME 930, the UE 900 detects equivalent PLMNs using the equivalent PLMN list included in the Attach Accept message. The UE 900 sets a registered PLMN as an MDT_PLMN and sets PLMNs corresponding to PLMN IDs included in the equivalent PLMN list as equivalent MDT_PLMNs if the eNB 910 commands the UE 900 to perform a radio network deployment state test process at step 917. Step 917 will be described as follow.

In this embodiment, the registered PLMN of the UE 900 is set as the MDT_PLMN. However, it will be understood by those of ordinary skill in the art that a PLMN which the UE 900 has selected can be set as the MDT_PLMN, not the registered PLMN of the UE 900. There can be various schemes for selecting a PLMN set as the MDT_PLMN, and the description of the various schemes for selecting the PLMN set as the MDT_PLMN will be omitted.

Otherwise, if an prior MME as an MME of the UE 900 is changed to a new MME while the UE 900 performs a handover process, the new MME receives the MDT user consent information from the prior MME using a UE context.

The MME 930 is the prior MME, the MME 930 transmits an Initial Context Setup Request message to the eNB 910 (step 913). The Initial Context Setup Request message includes Trace Activation information, and the Trace Activation information includes Logged Measurement Configuration information. The Logged Measurement Configuration information has been described in FIG. 2.

Otherwise, if the MME 930 is the new MME, the MME 930 transmits a Handover Request message to the eNB 910 (step 913). The Handover Request message includes Logged Measurement Configuration information.

After receiving the Initial Context Setup Request message or the Handover Request message from the MME 930, the eNB 910 stores the MDT Configuration information included in the Initial Context Setup Request message and checks an MDT Criteria (step 915). The MDT Configuration information and the operation of checking the MDT Criteria have been described in FIG. 2. Afterwards the eNB 910 transmits a RRC Connection Reconfiguration message to the UE 900 (step 917). The RRC Connection Reconfiguration message includes immediate MDT process information. The immediate MDT process information has been described in FIG. 2. The eNB 910 transmits an Initial Context Setup Response message as a response message to the Initial Context Setup Request message to the MME 930 (step 919).

After receiving the RRC Connection Reconfiguration message from the eNB 910, the UE 900 determines whether a registered PLMN of the UE 900 is an HPLMN or one of HEPLMNs, and performs related operation according to the determined result (step 921). That is, the UE 900 sets an MDT_PLMN as the registered PLMN, sets equivalent MDT_PLMNs as the HPLMN and the HEPLMNs, and performs an immediate MDT process if the registered PLMN is the HPLMN or one of the HEPLMNs. Alternatively, the UE 900 does not perform more operations if the registered PLMN is neither the HPLMN nor one of the HEPLMNs. In FIGS. 9A to 9B, step 921 is illustrated as "perform A operation". The UE 900 transmits a RRC Connection Reconfiguration Complete as a response message to the RRC Connection Reconfiguration message to the eNB 910 (step 923).

Upon detecting the necessity for a handover of the UE 900, the eNB 910 performs a handover process with the eNB 920, the MME 930 and the TCE 940 (step 925). The description of the handover process will be omitted. The eNB 910 transmits a HO Command message to the UE 900 (step 927). The HO Command message is a message indicating that the eNB 910 commands the UE 900 to handover from the eNB 910 to the eNB 920. After receiving the HO Command message from the eNB 910, the UE 900 transmits a Handover Confirmed message as a response message to the HO Command message to the eNB 920 (step 929).

After transmitting the Handover Confirmed message to the eNB 920, the UE 900 determines whether the target PLMN is an MDT_PLMN or one of the equivalent MDT_PLMNs, and performs a related operation according to the determined result (step 931). That is, the UE 900 continuously performs the immediate MDT process if the target PLMN is the MDT_PLMN or one of the equivalent MDT_PLMNs. Alternatively, the UE 900 stops performing the immediate MDT process if the target PLMN is neither the MDT_PLMN nor one of the equivalent MDT_PLMNs. It is noted that step 931 is illustrated as "perform C operation" in FIGS. 9A to 9B.

The eNB 920 determines whether the target PLMN of the UE 900 is the MDT_PLMN or one of the equivalent MDT_PLMNs (step 933). In FIGS. 9A to 9B, it will be assumed that the target PLMN of the UE 900 is the MDT_PLMN or one of the equivalent MDT_PLMNs. The eNB 920 transmits a UE Information Request message to the UE 900 (step 935). The UE Information Request message includes a logMeasReportReq parameter indicating that the eNB 920 requests the UE 900 to report the collected MDT process result. After receiving the UE Information Request message from the eNB 920, the UE 900 transmits a UE Information Response message including a logMeasReport parameter indicating the collected MDT process result to the eNB 920 (step 937). After receiving the UE Information Response message from the UE 900, the eNB 920 transmits a Trace Record Report message to the TCE 940 (step 939). The Trace Record Report message includes the logMeasReport parameter.

Although not illustrated in FIGS. 9A to 9B, the following operation will be additionally performed.

After the MDT user consent information acquisition process between the UE 900, the MME 930 and the HSS 950 has been performed, the MME 930 determines whether the MDT_PLMN of the UE 900 is identical to a PLMN of a GUMMEI as an operator PLMN of the MME 930, and the equivalent MDT_PLMNs of the UE 900 are identical to equivalent MDT PLMNs of the PLMN of the GUMMEI. In FIGS. 9A to 9B, it will be assumed that the MDT_PLMN of the UE 900 is identical to the PLMN of the GUMMEI, and the equivalent MDT_PLMNs of the UE 900 are identical to the equivalent MDT_PLMNs of the PLMN of the GUMMEI.

The MME 930 determines whether the registered PLMN of the UE 900 is identical to the MDT_PLMN or one of the equivalent MDT_PLMNs, and performs related operation according to the determined result. That is, the MME 930 generates MDT configuration information if the registered PLMN of the UE 900 is identical to the MDT_PLMN or one of the equivalent MDT_PLMNs. Alternatively, the MME 930 does not perform more operations if the registered PLMN of the UE 900 is not identical to the MDT_PLMN nor one of the equivalent MDT_PLMNs.

Figure 10:
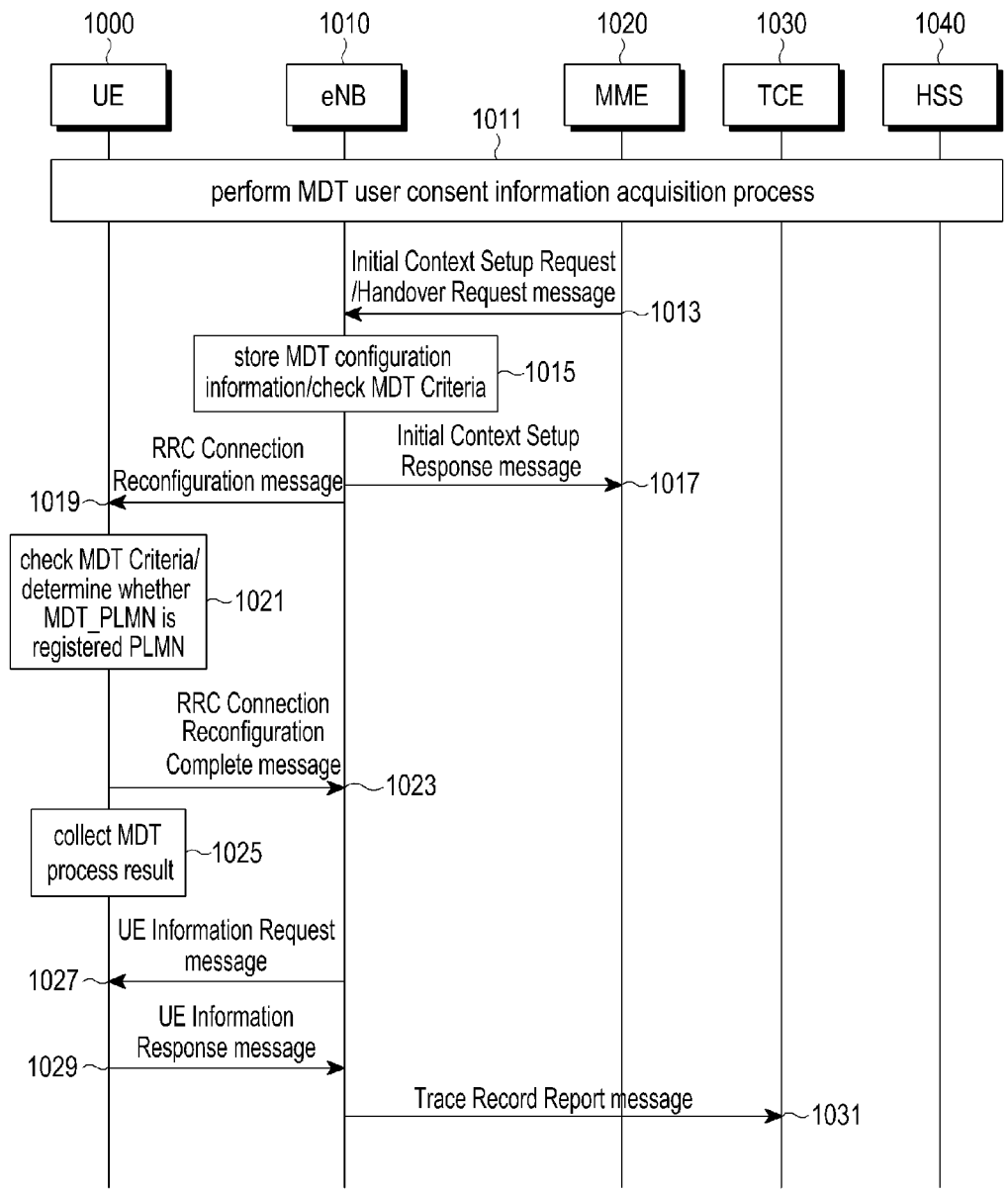
FIG. 10 is a signal flow diagram schematically illustrating performing an immediate MDT process in an EPS in accordance with the ninth embodiment of the present disclosure.

FIG. 10 is a signal flow diagram schematically illustrating performing an immediate MDT process in an EPS in accordance with the ninth embodiment of the present disclosure. The EPS includes a UE 1000, an eNB 1010, a MME 1020, a TCE 1030 and an HSS 1040. The UE 1000, the MME 1020 and the HSS 1040 perform a MDT user consent information acquisition process (step 1011). The MDT user consent information acquisition process will be described.

The UE 1000 transmits an Attach Request message to the MME 1020. After receiving the Attach Request message from the UE 1000, the MME 1020 transmits a Location Update Request message to the HSS 1040 in order to acquire subscriber information for the UE 1000. After receiving the Location Update Request message from the MME 1020, the HSS 1040 detects whether the UE 1000 consents to perform the MDT process, and transmits a Location Update ACK message, as a response message to the Location Update Request message, including the subscriber information of the UE 1000 including information indicating whether the UE 1000 consents to perform an MDT process according to the detection result.

After receiving the Location Update ACK message from the HSS 1040, the MME 1020 detects whether the UE 1000 consents to perform the MDT process from the Location Update ACK message, and generates MDT user consent information according to the detection result. In FIG. 10, it will be assumed that the UE 1000 consents to perform the MDT process, so the MDT user consent information indicates that the UE 1000 consents to perform the MDT process.

After receiving the Location Update ACK message including the subscriber information indicating that the UE 1000 consents to perform the MDT process from the HSS 1040, the MME 1020 stores the MDT user consent information generated according to the subscriber information as context information for the UE 1000, and transmits the initial context setup request message including the MDT user consent information to eNB 1010 while transferring an Attach Accept message including to the UE 1000 via the eNB 1010. The eNB 1010 can later command the UE 1000 to perform an MDT process after receiving the initial UE context setup request message including the MDT user consent information from the MME 1020.

The MME 1020 generates an equivalent PLMN list including PLMN IDs of PLMNs set as equivalent PLMNs, and transmits the equivalent PLMN list to the UE 1000. The equivalent PLMN list is transmitted to the UE 1000 through an Attach Accept message. After receiving the Attach Accept message from the MME 1030, the UE 1000 detects equivalent PLMNs using the equivalent PLMN list included in the Attach Accept message. The UE 1000 sets a registered PLMN as an MDT_PLMN and sets PLMNs corresponding to PLMN IDs included in the equivalent PLMN list as equivalent MDT_PLMNs if the eNB 1010 commands the UE 1000 to perform a radio network deployment state test process at step 1019. Step 1019 will be described as follow.

In this embodiment, the registered PLMN of the UE 1000 is set as the MDT_PLMN. However, it will be understood by those of ordinary skill in the art that a PLMN which the UE 1000 has selected can be set as the MDT_PLMN, not the registered PLMN of the UE 1000. There can be various schemes for selecting a PLMN set as the MDT_PLMN, and the description of the various schemes for selecting the PLMN set as the MDT_PLMN will be omitted.

Otherwise, if an MME of the UE 1000 a prior MME is changed to a new MME while the UE 1000 performs a handover process, the new MME receives the MDT user consent information from the prior MME using a UE context.

After the MDT user consent information acquisition process between the UE 1000, the MME 1020 and the HSS 1040 has been performed, if the MME 1020 is the prior MME, the MME 1020 transmits an Initial Context Setup Request message to the eNB 1010 (step 1013). The Initial Context Setup Request message includes Trace Activation information, and the Trace Activation information includes Logged Measurement Configuration information. The Logged Measurement Configuration information has been described in FIG. 2. Otherwise, if the MME 1020 is the new MME, the MME 1020 transmits a Handover Request message to the eNB 1010 (step 1013). The Handover Request message includes the Logged Measurement Configuration information.

After receiving the Initial Context Setup Request message or the Handover Request message, the eNB 1010 stores the MDT Configuration information included in the Initial Context Setup Request message or the Handover Request message and checks a MDT Criteria (step 1015). The MDT Configuration information and the MDT Criteria check operation have been described in FIG. 2.

The eNB 1010 transmits an Initial Context Setup Response message as a response message to the Initial Context Setup Request message to the MME 1020 (step 1017). The eNB 1010 transmits a RRC Connection Reconfiguration message to the UE 1000 (step 1019). The RRC Connection Reconfiguration message includes immediate MDT configuration information. The immediate MDT configuration information has been described in FIG. 2. After receiving the RRC Connection Reconfiguration message, the UE 1000 determines whether an MDT_PLMN is a registered PLMN of the UE 1000 by checking the MDT Criteria (step 1021). In FIG. 10, it will be assumed that the MDT_PLMN is the registered PLMN if the MME 1020 is the prior MME.

The UE 1000 transmits a RRC Connection Reconfiguration Complete message as a response message to the RRC Connection Reconfiguration message to the eNB 1010 (step 1023). The UE 1000 performs an MDT process using an immediate MDT scheme, and collects a MDT process result according to the MDT process performance (step 1025).

After receiving the RRC Connection Reconfiguration Complete message from the UE 1000, the eNB 1010 transmits a UE Information Request message to the UE 1000 (step 1027). The UE Information Request message includes a logMeasReportReq parameter indicating that the eNB 1010 requests the UE 1000 to report the collected MDT process result. After receiving the UE Information Request message from the eNB 1010, the UE 1000 transmits a UE Information Response message including a logMeasReport parameter indicating that the UE 1000 transmits the collected MDT process result to the eNB 1010 (step 1029). After receiving the UE Information Response message from the UE 1000, the eNB 1010 transmits a Trace Record Report message to the TCE 1030 (step 1031). The Trace Record Report message includes the logMeasReport parameter.

Figure 11:
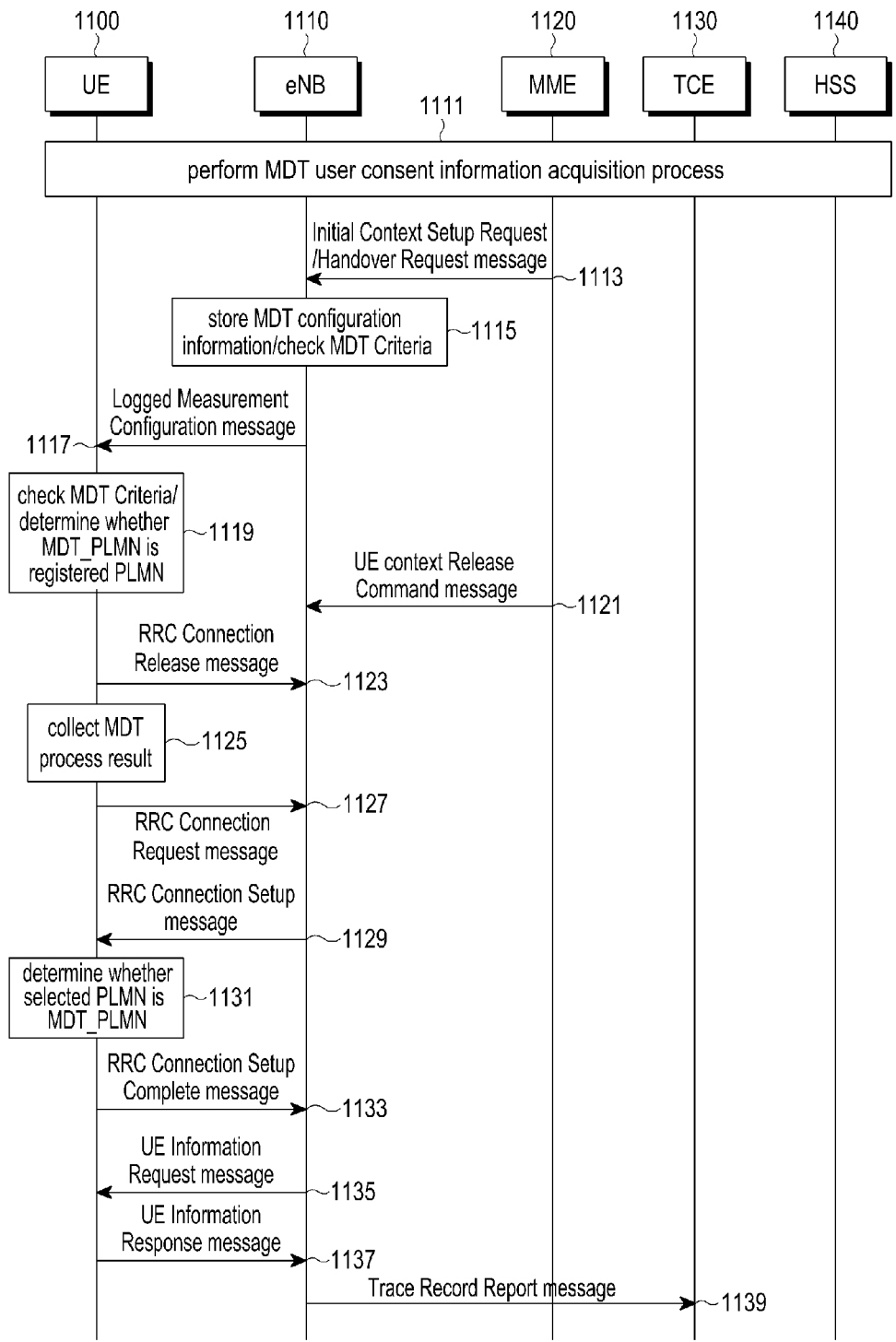
FIG. 11 is a signal flow diagram schematically illustrating performing a logged MDT process in an EPS in accordance with the tenth embodiment of the present disclosure.

FIG. 11 is a signal flow diagram schematically illustrating performing a logged MDT process in an EPS in accordance with the tenth embodiment of the present disclosure. The EPS includes a UE 1100, an eNB 1110, a MME 1120, a TCE 1130 and an HSS 1140.

The operations of steps 1111 to 1115 in FIG. 11 are identical to those of steps 1011 to 1015 in FIG. 10, and the operations of steps 1135 to 1139 are identical to those of steps 1027 to 1031 illustrated in FIG. 10, so the detailed description of the operations of the steps 1111 to 1115 and 1135 to 1139 will be omitted.

The eNB 1110 transmits a Logged Measurement Configuration message to the UE 1100 (step 1117). The Logged Measurement Configuration message includes a logged MDT process result. After receiving the Logged Measurement Configuration message, the UE 1100 determines whether an MDT_PLMN of the UE 1100 is a registered PLMN by checking an MDT Criteria (step 1119). In FIG. 11, it will be assumed that the MDT_PLMN is the registered PLMN.

The MME 1120 transmits a UE context Release Command message to the eNB 1110 (step 1121). After receiving the UE context Release Command message from the MME 1120, the eNB 1110 transmits a RRC Connection Release message to the UE 1100 (step 1123). After receiving the RRC Connection Release message, the UE 1100 releases a RRC connection established between the UE 1100 and the eNB 1110, and operates in an idle mode according to the RRC connection release. The UE 1100 performs an MDT process suing a logged MDT scheme, and collects an MDT process result according to an MDT process performance result (step 1125).

In certain embodiments, if the UE 800 wants to reestablish a RRC connection with the eNB 1110 in the state which a RRC connection between the UE 1100 and the eNB 1110 is released, the UE 1100 transmits a RRC Connection Request message to the eNB 1110 (step 1127). It will be understood by those of ordinary skill in the art that a timing point at which the UE 1100 reestablishes the RRC connection with the eNB 1110 is not limited hereto. After receiving the RRC Connection Request message from the UE 1100, the eNB 1110 detects that the UE 1100 requests a RRC connection, so transmits a RRC Connection Setup message requesting setup of the RRC connection to the UE 1100 (step 1129).

After receiving the RRC Connection Setup message from the eNB 1110, the UE 1110 compares a selected PLMN with the MDT_PLMN (step 1131). The reason why the UE 1100 compares the selected PLMN with the MDT_PLMN is that the UE 1100 can set the selected PLMN, not the registered PLMN as the MDT_PLMN. There can be various schemes for selecting a PLMN set as the MDT_PLMN, and the description of the various schemes for selecting the PLMN set as the MDT_PLMN will be omitted.

The UE 1100 transmits a RRC Connection Setup Complete message as a response message to the RRC Connection Setup message to the eNB 1110 (step 1133). The RRC Connection Setup Complete message includes a logMeasAvailable parameter indicating an available MDT process result.

Figure 12:
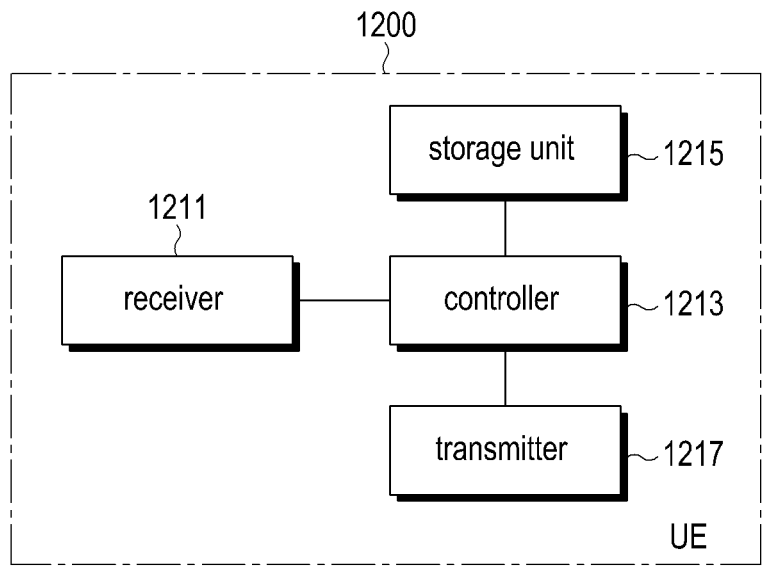
FIG. 12 is a block diagram schematically illustrating an internal structure of a UE in an EPS in accordance with embodiments of the present disclosure.

FIG. 12 is a block diagram schematically illustrating an internal structure of a UE in an EPS in accordance with embodiments of the present disclosure. A UE 1200 includes a receiver 1211, a controller 1213, a storage unit 1215 and a transmitter 1217.

The controller 1213 controls the overall operation of the UE 1200, specially controls the UE 1200 to continuously perform an immediate MDT process and a logged MDT process in equivalent MDT_PLMNs as well as an MDT_PLMN. The immediate MDT process and the logged MDT process in the equivalent MDT_PLMNs as well as the MDT_PLMN is performed in the manner described above with reference to FIGS. 2 to 11, so the detailed description will be omitted herein.

The receiver 1211 receives messages from an eNB etc. under a control of the controller 1213.

The storage unit 1215 stores the messages received by the receiver 1211 and data required for an operation of the UE 1200.

The transmitter 1217 transmits messages to the eNB etc. under the control of the controller 1213.

While the receiver 1211, the controller 1213, the storage unit 1215 and the transmitter 1217 are shown in FIG. 12 as separate units, it is to be understood that this is for merely convenience of description. In other words, the receiver 1211, the controller 1213, the storage unit 1215 and the transmitter 1217 can be incorporated into a single unit.

Figure 13:
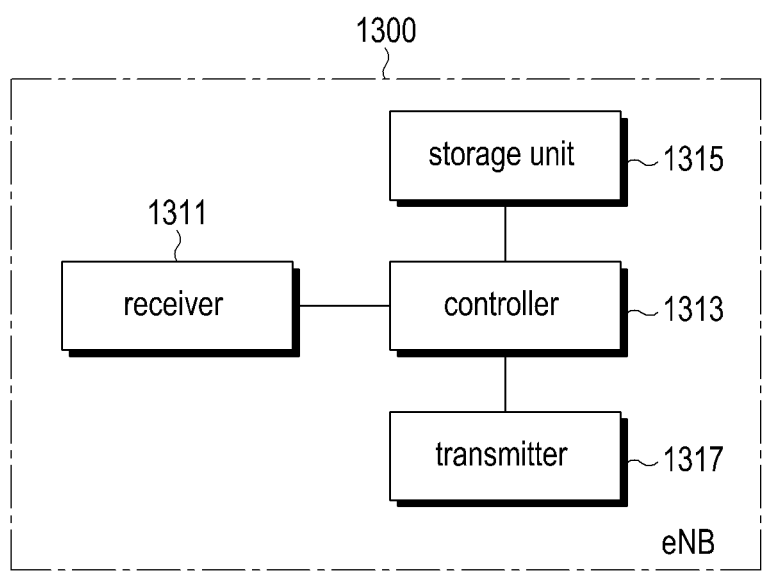
FIG. 13 is a block diagram schematically illustrating an internal structure of an eNB in an EPS in accordance with embodiments of the present disclosure.

FIG. 13 is a block diagram schematically illustrating an internal structure of an eNB in an EPS in accordance with embodiments of the present disclosure. An eNB 1300 includes a receiver 1311, a controller 1313, a storage unit 1315 and a transmitter 1317.

The controller 1313 controls the overall operation of the eNB 1300, specially controls the eNB 1300 to support that a UE continuously performs an immediate MDT process and a logged MDT process in equivalent MDT_PLMNs as well as an MDT_PLMN. The operation of supporting that the UE continuously performs the immediate MDT process and the logged MDT process in the equivalent MDT_PLMNs as well as the MDT_PLMN is performed in the manner described above with reference to FIGS. 2 to 11, so the detailed description will be omitted herein.

The receiver 1311 receives messages from a UE, an MME, a TCE, etc. under a control of the controller 1313.

The storage unit 1315 stores the messages received by the receiver 1311 and data required for an operation of the eNB 1300.

The transmitter 1317 transmits messages to the UE, the MME, the TCE, etc. under the control of the controller 1313.

While the receiver 1311, the controller 1313, the storage unit 1315 and the transmitter 1317 are shown in FIG. 13 as separate units, it is to be understood that this is for merely convenience of description. In other words, the receiver 1311, the controller 1313, the storage unit 1315 and the transmitter 1317 can be incorporated into a single unit.

Figure 14:
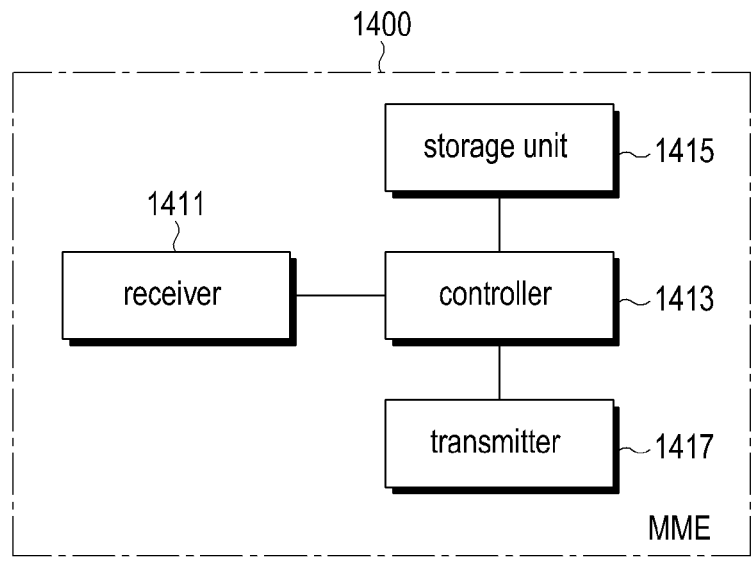
FIG. 14 is a block diagram schematically illustrating an internal structure of an MME in an EPS in accordance with embodiments of the present disclosure.

FIG. 14 is a block diagram schematically illustrating an internal structure of an MME in an EPS in accordance with embodiments of the present disclosure. An MME 1400 includes a receiver 1411, a controller 1413, a storage unit 1415 and a transmitter 1417.

The controller 1413 controls the overall operation of the MME 1400, specially controls the MME 1400 to support that a UE continuously performs an immediate MDT process and a logged MDT process in equivalent MDT_PLMNs as well as an MDT_PLMN. The operation of supporting that the UE continuously performs the immediate MDT process and the logged MDT process in the equivalent MDT_PLMNs as well as the MDT_PLMN is performed in the manner described above with reference to FIGS. 2 to 11, so the detailed description will be omitted herein.

The receiver 1411 receives messages from an eNB etc. under a control of the controller 1413.

The storage unit 1415 stores the messages received by the receiver 1411 and data required for an operation of the MME 1400.

The transmitter 1417 transmits messages to the eNB etc. under the control of the controller 1413.

While the receiver 1411, the controller 1413, the storage unit 1415 and the transmitter 1417 are shown in FIG. 14 as separate units, it is to be understood that this is for merely convenience of description. In other words, the receiver 1411, the controller 1413, the storage unit 1415 and the transmitter 1417 can be incorporated into a single unit.

Figure 15:
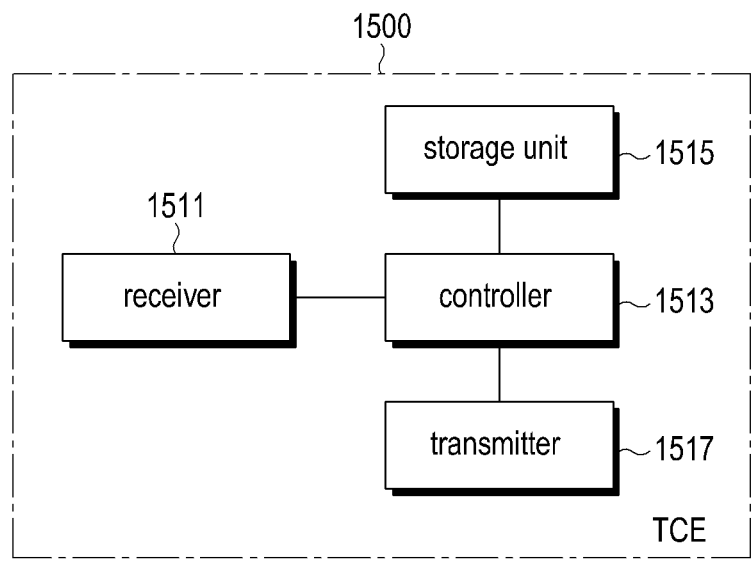
FIG. 15 is a block diagram schematically illustrating an internal structure of a TCE in an EPS in accordance with embodiments of the present disclosure.

FIG. 15 is a block diagram schematically illustrating an internal structure of a TCE in an EPS in accordance with embodiments of the present disclosure. A TCE 1500 includes a receiver 1511, a controller 1513, a storage unit 1515 and a transmitter 1517.

The controller 1513 controls the overall operation of the TCE 1500, specially controls the TCE 1500 to support that a UE continuously performs an immediate MDT process and a logged MDT process in equivalent MDT_PLMNs as well as an MDT_PLMN. The operation of supporting that the UE continuously performs the immediate MDT process and the logged MDT process in the equivalent MDT_PLMNs as well as the MDT_PLMN is performed in the manner described above with reference to FIGS. 2 to 11, so the detailed description will be omitted herein.

The receiver 1511 receives messages from an eNB etc. under a control of the controller 1513.

The storage unit 1515 stores the messages received by the receiver 1511 and data required for an operation of the TCE 1500.

The transmitter 1517 transmits messages to the eNB etc. under the control of the controller 1513.

While the receiver 1511, the controller 1513, the storage unit 1515 and the transmitter 1517 are shown in FIG. 15 as separate units, it is to be understood that this is for merely convenience of description. In other words, the receiver 1511, the controller 1513, the storage unit 1515 and the transmitter 1517 can be incorporated into a single unit.

Figure 16:
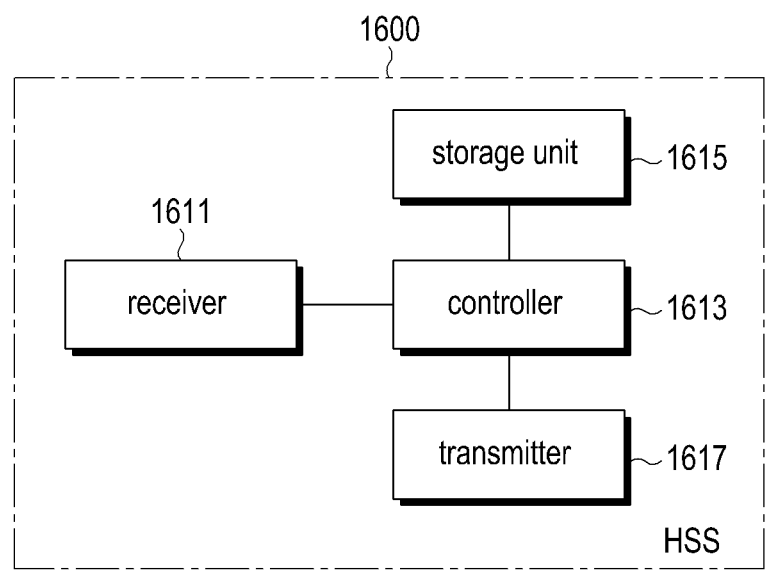
FIG. 16 is a block diagram schematically illustrating an internal structure of an HSS in an EPS in accordance with embodiments of the present disclosure.

FIG. 16 is a block diagram schematically illustrating an internal structure of an HSS in an EPS in accordance with embodiments of the present disclosure. An HSS 1600 includes a receiver 1611, a controller 1613, a storage unit 1615 and a transmitter 1617.

The controller 1613 controls the overall operation of the HSS 1600, specially controls the HSS 1600 to support that a UE continuously performs an immediate MDT process and a logged MDT process in equivalent MDT_PLMNs as well as an MDT_PLMN. The operation of supporting that the UE performs the immediate MDT process and the logged MDT process in the equivalent MDT_PLMNs as well as the MDT_PLMN is performed in the manner described above with reference to FIGS. 2 to 11, so the detailed description will be omitted herein.

The receiver 1611 receives messages from an MME etc. under a control of the controller 1613.

The storage unit 1615 stores the messages received by the receiver 1611 and data required for an operation of the HSS 1600.

The transmitter 1617 transmits messages to the MME etc. under the control of the controller 1613.

While the receiver 1611, the controller 1613, the storage unit 1615 and the transmitter 1617 are shown in FIG. 16 as separate units, it is to be understood that this is for merely convenience of description. In other words, the receiver 1611, the controller 1613, the storage unit 1615 and the transmitter 1617 can be incorporated into a single unit.

As is apparent from the foregoing description, exemplary embodiments of the present disclosure enable a UE to continuously perform an MDT process if a mobile communication service operator use a plurality of PLMN IDs for a PLMN.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for communicating by a terminal in a wireless communication system, the method comprising:
   receiving, from a base station, a configuration message for a logged minimization of drive test (MDT) measurement, the configuration message including a MDT_public land mobile network (PLMN) list; and
   transmitting, to the base station, information indicating an availability of the MDT measurements in a registered PLMN (RPLMN) based on whether the RPLMN is included in the MDT_PLMN list,
   wherein the RPLMN is a PLMN in which the terminal is registered and an MDT_PLMN is a PLMN in which the terminal is allowed to perform an MDT process, and
   wherein the MDT_PLMN list is received, by the base station from a mobility management entity (MME), through at least one of an initial context setup request message and a handover request message.

2. The method as claimed in claim 1, wherein the MDT_PLMN list is received through one of an attach accept message, a tracking area update (TAU) message, and a radio resource control (RRC) message if the MDT_PLMN list is received from the MME, and
   wherein the MDT_PLMN list is received through one of the attach accept message and the RRC message if the MDT_PLMN list is received from the base station.

3. The method as claimed in claim 1, further comprising: performing an attach process with the MME.

4. The method as claimed in claim 3, wherein the performing the attach process with MME comprises transmitting an attach request message to the MME, thereby the MME performs a process detecting whether the terminal consents to perform the MDT process with a home subscriber server (HSS) and stores information indicating whether the terminal consents to perform the MDT process as context information for the terminal.

5. The method as claimed in claim 1, further comprising:
receiving, from the base station, a configuration message for a logged MDT measurement, the configuration message including logged MDT process information necessary for performing a logged MDT process as an MDT process using a logged MDT scheme and the MDT_PLMN list, setting a PLMN of a cell in which the terminal camps as a PLMN in which the terminal performs the logged MDT process if the PLMN of the cell in which the terminal camps is the MDT PLMN, or the PLMN of the cell in which the terminal camps is included in MDT PLMNs, and
performing the logged MDT process using the logged MDT process information.

6. The method as claimed in claim 5, further comprising:
stopping a process which has been currently performed if the PLMN of the cell in which the terminal camps is not the MDT PLMN nor the MDT PLMNs.

7. The method as claimed in claim 5, further comprising:
receiving, from the base station, a radio resource control (RRC) connection release message;
releasing a RRC connection established with the base station;
transmitting, to the base station, a RRC connection request message upon intending to reestablish a RRC connection with the base station;
receiving, from the base station, a RRC connection setup message as a response message to the RRC connection request message;
setting a value of a logMeasAvailable parameter indicating an available MDT process result according to whether a PLMN of a cell of the base station is an MDT PLMN or one of MDT PLMNs; and
transmitting, to the base station, a RRC connection setup complete message as a response message to the RRC connection setup message,
wherein the RRC connection setup complete message includes the logMeasAvailable parameter.

8. The method as claimed in claim 1, further comprising:
receiving, from the base station, a configuration message for a logged MDT measurement, the configuration message including logged MDT process information necessary for performing a logged MDT process as an MDT process using a logged MDT scheme and the MDT_PLMN list, and performing a logged MDT process using the logged MDT process information if the MDT PLMN of the terminal is a registered PLMN of the terminal.

9. The method as claimed in claim 8, further comprising:
receiving, from the base station, a radio resource control (RRC) connection release message;
releasing a RRC connection established with the base station;
transmitting, to the base station, a RRC connection request message upon intending to reestablish a RRC connection with the base station;
receiving, from the base station, a RRC connection setup message as a response message to the RRC connection request message; and
transmitting, to the base station, a RRC connection setup complete message as a response message to the RRC connection setup message if a PLMN which the terminal has selected is an MDT PLMN,
wherein the RRC connection setup complete message includes information indicating an availability of the MDT measurements in the selected PLMN if the PLMN is in the MDT PLMN list.

10. The method as claimed in claim 8, further comprising:
receiving, from the base station, a terminal information request message including a logMeasReportReq parameter indicating that the base station requests the terminal to report a collected MDT process result indicating a result according to a logged MDT process performance; and
transmitting, to the base station, a terminal information response message including a logMeasReport parameter indicating that the terminal reports the collected MDT process result according to the logged MDT process performance.

11. A terminal in a wireless communication system, comprising:
a transceiver;
a controller, coupled to the transceiver, configured to:
receive, from a base station, a configuration message for a logged minimization of drive test (MDT) measurement, the configuration message including a MDT_ public land mobile network (PLMN) list; and
transmit, to the base station, information indicating an availability of the MDT measurements in a registered PLMN (RPLMN) based on whether the RPLMN is included in the MDT PLMN list,
wherein the RPLMN is a PLMN in which the terminal is registered and the MDT PLMN is a PLMN in which the terminal is allowed to perform an MDT process, and
wherein the MDT PLMN list is received, by the base station from a mobility management entity (MME), through at least one of an initial context setup request message and a handover request message.

12. The terminal as claimed in claim 11, wherein the MDT_PLMN list is received through one of an attach accept message, a tracking area update (TAU) message, and a radio resource control (RRC) message if the MDT_PLMN list is received from the MME, and
wherein the MDT_PLMN list is received through one of the attach accept message and the RRC message if the MDT_PLMN list is received from the base station.

13. The terminal as claimed in claim 11, wherein the controller performs an attach process with the MME.

14. The terminal as claimed in claim 11, wherein the controller transmits an attach request message to the MME, thereby the MME performs a process detecting whether the terminal consents to perform the MDT process with a home subscriber server (HSS) and stores information indicating whether the terminal consents to perform the MDT process as context information for the terminal.

15. The terminal as claimed in claim 11,
wherein the controller receives from the base station a configuration message for logged measurement, the configuration message including logged MDT process information necessary for performing a logged MDT process as an MDT process using a logged MDT scheme and the MDT_PLMN list, and
wherein the controller sets a PLMN of a cell in which the terminal camps as a PLMN in which the terminal performs the logged MDT process if the PLMN of the cell in which the terminal camps is the MDT PLMN, or the PLMN of the cell in which the terminal camps is included in MDT PLMNs, and performs the logged MDT process using the logged MDT process information.

16. The terminal as claimed in claim 15, wherein the controller stops a process which has been currently performed if the PLMN of the cell in which the terminal camps is not the MDT PLMN nor in the MDT PLMNs.

17. The terminal as claimed in claim 15,
wherein the transceiver receives from the base station a radio resource control (RRC) connection release message, the controller releases a RRC connection established with the base station,
wherein the controller transmits to the base station a RRC connection request message upon intending to reestablish a RRC connection with the base station, and receives from the base station a RRC connection setup message as a response message to the RRC connection request message, and the controller sets a value of a logMeasAvailable parameter indicating an available MDT process result according to whether a PLMN of a cell of the base station is an MDT PLMN or one of MDT PLMNs,
wherein the controller transmits to the base station a RRC connection setup complete message as a response message to the RRC connection setup message, and
wherein the RRC connection setup complete message includes the logMeasAvailable parameter.

18. The terminal as claimed in claim 11,
wherein the controller receives from the base station a configuration message for logged measurement, the configuration message including logged MDT process information necessary for performing a logged MDT process as an MDT process using a logged MDT scheme and the MDT_PLMN list, and
wherein the controller performs a logged MDT process using the logged MDT process information if the MDT PLMN of the terminal is a registered PLMN of the terminal.

19. The terminal as claimed in claim 18, further comprising:
wherein the controller receives from the base station a radio resource control (RRC) connection release message, the controller releases a RRC connection established with the base station,
wherein the controller transmits to the base station a RRC connection request message upon intending to reestablish a RRC connection with the base station, the controller receives from the base station a RRC connection setup message as a response message to the RRC connection request message, and
wherein the controller transmits to the base station a RRC connection setup complete message as a response message to the RRC connection setup message if a PLMN which the terminal has selected is an MDT PLMN, and
wherein the RRC connection setup complete message includes the information indicating an availability of the MDT measurements in the selected PLMN if the PLMN is in the MDT PLMN list.

20. The terminal as claimed in claim 18,
wherein the controller receives from the base station a terminal information request message including a logMeasReportReq parameter indicating that the base station requests the terminal to report a collected MDT process result indicating a result according to a logged MDT process performance, and
wherein the transceiver transmits to the base station a terminal information response message including a logMeasReport parameter indicating that the terminal reports the collected MDT process result according to the logged MDT process performance.

* * * * *